(12) United States Patent
Panasik et al.

(10) Patent No.: US 7,156,600 B2
(45) Date of Patent: Jan. 2, 2007

(54) DIE FOR, METHOD OF MAKING, AND FASTENER WITH LOBED PRIMARY THREAD LEAD AND INTERPOSED DUAL AUXILIARY THREAD LEAD WITH IMPROVED SUBSTRATE ENTRY END PORTION

(75) Inventors: Cheryl L. Panasik, Elburn, IL (US); Kenneth R. LeVey, West Chicago, IL (US); Robert B. Fischer, Roselle, IL (US)

(73) Assignee: Illinois Tool Works Inc., Glenview, IL (US)

( * ) Notice: Subject to any disclaimer, the term of this patent is extended or adjusted under 35 U.S.C. 154(b) by 107 days.

(21) Appl. No.: 10/845,461

(22) Filed: May 13, 2004

(65) Prior Publication Data

US 2005/0158149 A1 Jul. 21, 2005

Related U.S. Application Data

(63) Continuation-in-part of application No. 10/413,751, filed on Apr. 15, 2003, now abandoned, and a continuation-in-part of application No. 10/323,265, filed on Dec. 18, 2002, which is a continuation-in-part of application No. 10/095,404, filed on Mar. 12, 2002, which is a continuation-in-part of application No. 09/885,796, filed on Jun. 19, 2001, now Pat. No. 6,899,500.

(60) Provisional application No. 60/438,228, filed on Jan. 6, 2003.

(51) Int. Cl.
*F16B 35/04* (2006.01)
*F16B 25/10* (2006.01)
*F16B 25/00* (2006.01)

(52) U.S. Cl. ............ 411/411; 411/412; 411/416; 411/308; 72/103; 72/88; 470/185; 470/66; 470/70; 470/10

(58) Field of Classification Search ........ 411/411–413, 411/309–311, 308, 416
See application file for complete search history.

(56) References Cited

U.S. PATENT DOCUMENTS

| | | | |
|---|---|---|---|
| 3,207,023 A | 9/1965 | Knohl | |
| 3,258,797 A | 7/1966 | Budd | |
| 3,661,194 A | 5/1972 | MacFarlane et al. | |
| 3,978,760 A * | 9/1976 | Muenchinger | ............... 411/386 |
| 4,034,641 A | 7/1977 | Williams, Jr. et al. | |
| 4,040,328 A * | 8/1977 | Muenchinger | ............... 411/412 |
| 4,194,430 A * | 3/1980 | Muenchinger | ............... 411/415 |
| 4,430,036 A | 2/1984 | Chapman | |
| 4,486,135 A | 12/1984 | Kazino | |
| 4,637,767 A | 1/1987 | Yaotani et al. | |
| 4,652,194 A | 3/1987 | Tajima et al. | |
| 4,716,751 A | 1/1988 | Wozniak | |
| 4,718,802 A | 1/1988 | Rockenfeller et al. | |

(Continued)

FOREIGN PATENT DOCUMENTS

DE EP 0433484 * 6/1991

(Continued)

*Primary Examiner*—Katherine Mitchell
(74) *Attorney, Agent, or Firm*—Schwartz & Weinrieb

(57) ABSTRACT

A threaded fastener comprises a first, primary thread lead, and a pair of second, auxiliary thread leads alternatively interposed between successive threads of the first, primary thread lead, except within the vicinity of the tip portion of the fastener so as to define space for accommodating debris generated during the self-tapping of the fastener into a workpiece. The fastener also comprises lobe members formed upon the primary thread lead so as to predeterminedly affect torque insertion and pull-out resistance values.

40 Claims, 9 Drawing Sheets

U.S. PATENT DOCUMENTS

| | | |
|---|---|---|
| 4,793,219 A | 12/1988 | Wozniak |
| 4,793,220 A | 12/1988 | Yamamoto et al. |
| 4,820,098 A | 4/1989 | Taubert et al. |
| 4,842,467 A | 6/1989 | Armstrong |
| 4,973,209 A * | 11/1990 | Essom et al. ............... 411/386 |
| 5,044,853 A | 9/1991 | Dicke |
| 5,061,136 A | 10/1991 | Dixon et al. |
| 5,110,245 A | 5/1992 | Hiroyuki |
| 5,188,496 A | 2/1993 | Giannuzzi |
| 5,282,708 A | 2/1994 | Giannuzzi |
| 5,294,227 A | 3/1994 | Forster et al. |
| 5,385,439 A | 1/1995 | Hurdle |
| RE34,969 E | 6/1995 | Dixon et al. |
| 5,674,035 A | 10/1997 | Hettich et al. |
| 5,743,914 A | 4/1998 | Skiba |
| 5,779,417 A * | 7/1998 | Barth et al. ................. 411/412 |
| 5,827,030 A | 10/1998 | Dicke |
| 5,885,041 A | 3/1999 | Giannuzzi et al. |
| 5,897,280 A | 4/1999 | Dicke |
| 5,921,735 A | 7/1999 | Hughes |
| 5,957,646 A | 9/1999 | Giannuzzi et al. |
| 5,961,267 A | 10/1999 | Goss et al. |
| 6,045,312 A | 4/2000 | Hsing |
| 6,056,491 A | 5/2000 | Hsu |
| 6,086,302 A | 7/2000 | Gerhard |
| 6,250,866 B1 | 6/2001 | Devine |
| 6,254,327 B1 | 7/2001 | Chen |
| 6,296,433 B1 | 10/2001 | Forsell et al. |
| 6,340,277 B1 | 1/2002 | Koenig et al. |
| 6,419,435 B1 | 7/2002 | Gaudron |

FOREIGN PATENT DOCUMENTS

| | | | |
|---|---|---|---|
| DE | 19735280 | * | 2/1999 |
| GB | 1482624 | * | 8/1977 |

* cited by examiner

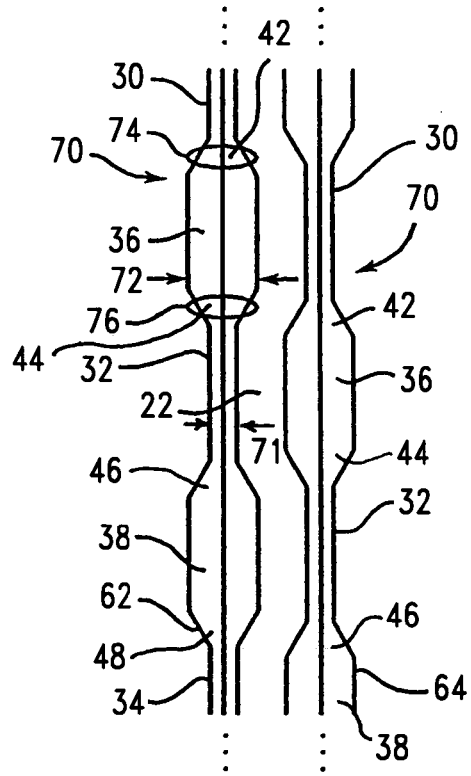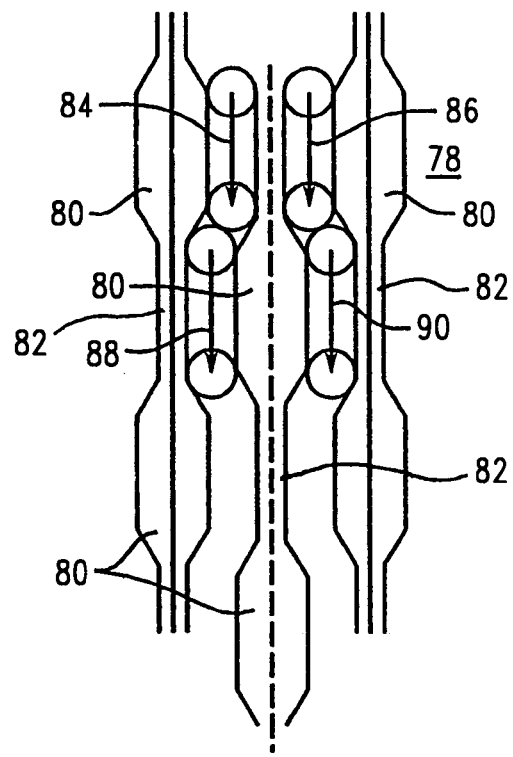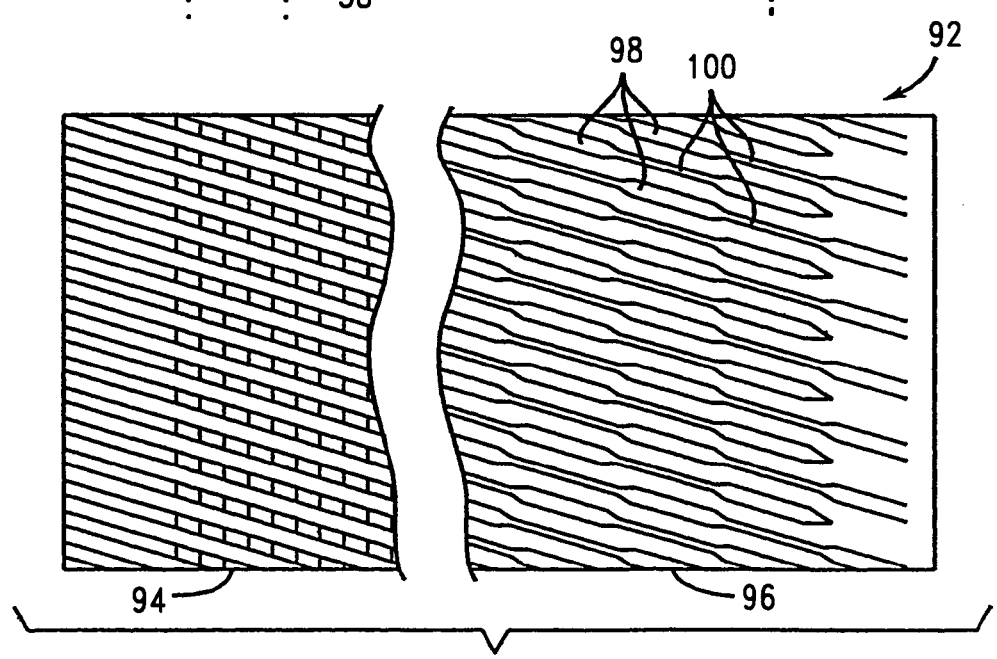

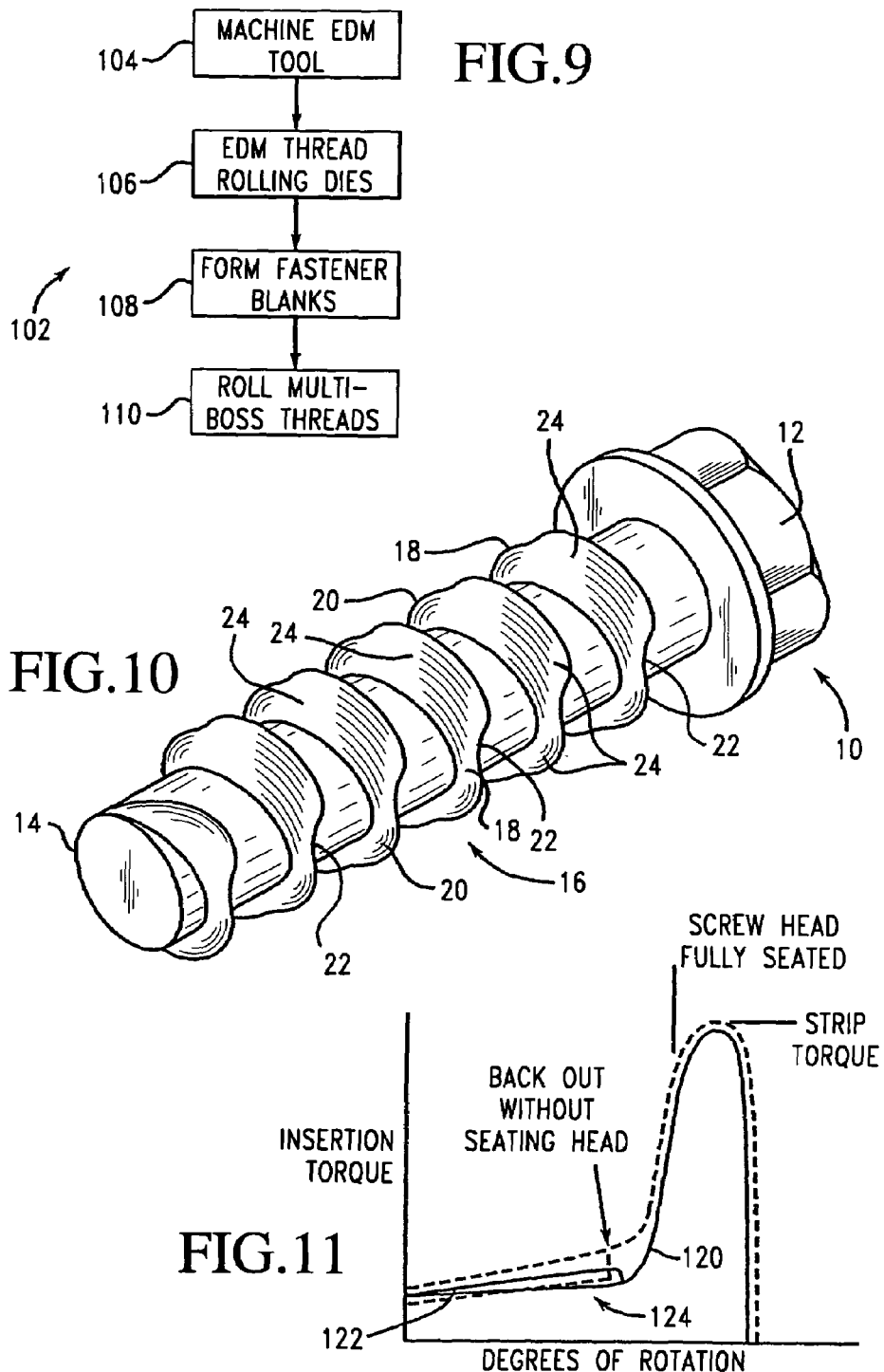

FIG. 15
(PRIOR ART)
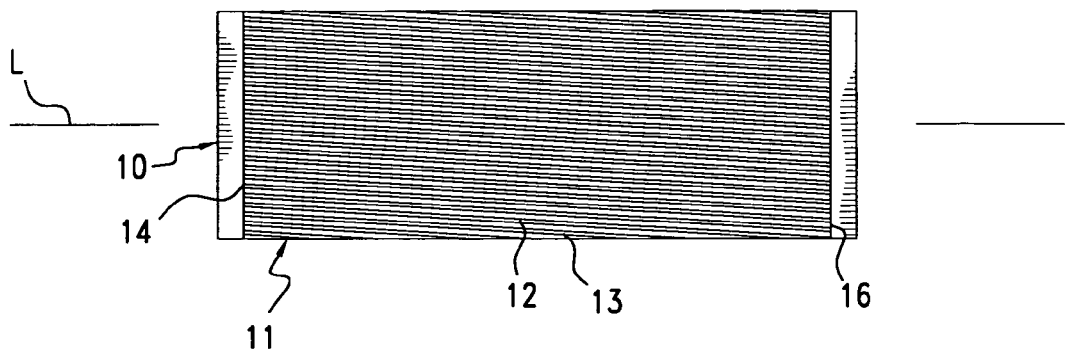
FIG. 16
(PRIOR ART)
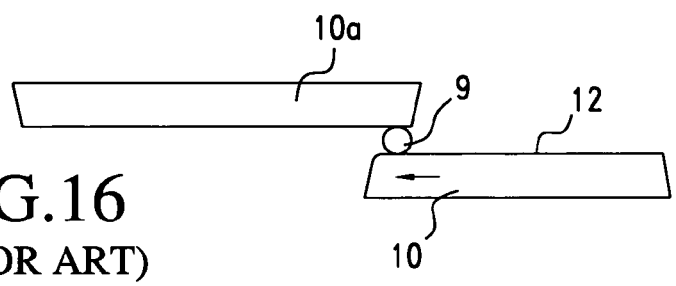
FIG. 17
(PRIOR ART)

DIE FOR, METHOD OF MAKING, AND FASTENER WITH LOBED PRIMARY THREAD LEAD AND INTERPOSED DUAL AUXILIARY THREAD LEAD WITH IMPROVED SUBSTRATE ENTRY END PORTION

CROSS REFERENCE TO RELATED PATENT APPLICATIONS

This patent application is a Continuation-in-Part (CIP) of United States Patent Application which is entitled THREADED FASTENER WITH DUAL REINFORCING LEADS AND IMPROVED SUBSTRATE ENTRY END PORTION, which was filed on Apr. 15, 2003 now abandoned supplemental to provisional patent application Ser. No. 60/438,228 which was filed on Jan. 6, 2003, which has been assigned Ser. No. 10/413,751, and which, in turn, is also a Continuation-in-Part (CIP) of United States Patent Application which is entitled THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER, which was filed on Dec. 18, 2002, and which has been assigned Ser. No. 10/323,265, and still further, this patent application is a Continuation-in-Part (CIP) of U.S. patent application which is entitled FASTENER HAVING MULTIPLE LOBED THREAD, which was filed on Mar. 12, 2002, which has been assigned Ser. No. 10/095,404, and which, in turn, is also a Continuation-in-Part (CIP) of U.S. patent application which is entitled FASTENER HAVING MULTIPLE-BOSSED LEAD, which was filed on Jun. 19, 2001, and which has been assigned Ser. No. 09/885,796 now U.S. Pat. No. 6,899,500.

FIELD OF THE INVENTION

The present invention relates generally to threaded fasteners, and more particularly to a new and improved threaded fastener which has dual reinforcing lead structure integrally incorporated thereon for facilitating and simplifying the manufacture of the threaded fastener, an improved entry or lead end portion for facilitating the insertion of the fastener into underlying substrates whereby enhanced depth penetration of the threaded fastener into the underlying substrate or workpiece can be achieved, and multiple boss or lobe structure for providing enhanced insertion torque and pull-out resistance properties.

BACKGROUND OF THE INVENTION

In the field of threaded fasteners, a wide range of configurations is known and is currently available. In general, threaded fasteners comprise a shank portion upon which one or more thread leads are formed. The thread leads create or define a helical inclined plane along which the fastener threads contact or engage surface portions of an object or substrate into or out from which the threaded fastener is to be inserted or removed as the threaded fastener is rotated in either the clockwise or counterclockwise direction. Various threaded fastener designs, including the formation of the thread leads thereon, have been specifically developed for use within different substrate materials, such as, for example, wood, metal, composite materials, concrete, and the like. In connection with most threaded fasteners, a head is formed upon one end of the shank portion so as to facilitate the rotation of the threaded fastener into and out of the substrate material, an insertion tip portion is formed upon the opposite end of the shank portion, and the thread lead is formed upon the shank portion between the head and tip portions of the fastener. The particular structural characteristics or features of the thread lead determine both the torque insertion and torque withdrawal properties of the threaded fastener, as well as the pull-out resistance properties of the threaded fastener once the fastener is threadedly disposed within the substrate material.

In connection with the fabrication of most conventional threaded fasteners, the thread lead is uniform in shape throughout the entire axial extent of the fastener shank portion, however, specialty fasteners have been developed which have incorporated a variety of different structural features upon the thread lead. For example, threaded fasteners having ridges or depressions along the thread lead have been developed so as to be specifically capable of penetrating certain substrate materials. For the most part, however, these designs have compromised flexibility with respect to being used in connection with diverse applications, and in addition, optimal performance during usage has likewise been adversely affected.

A need therefore exists in the art for a new and improved threaded fastener, which can be adapted for specific purposes and substrate materials, through means of unique structural features integrally incorporated within the thread lead, wherein the driving or insertion torque required to rotate the threaded fastener in connection with the rotational driving and axial insertion of the same into an underlying substrate is substantially uniform or constant, and sufficiently reduced so as not to exceed the torsional strength characteristics of the material from which the threaded fastener is fabricated whereby the threaded fastener will be permitted to be inserted within the underlying substrate to its fully required or desired penetration depth without experiencing any fracture or separation of the driven head portion of the threaded fastener, and wherein further, the threaded fastener can be manufactured in a relatively simple and economical manner.

OBJECTS OF THE INVENTION

Accordingly, it is an object of the present invention to provide a new and improved dual, reinforcing-lead threaded fastener.

Another object of the present invention is to provide a new and improved dual, reinforcing-lead threaded fastener whereby the various operational drawbacks or disadvantages characteristic of PRIOR ART threaded fasteners are effectively overcome.

An additional object of the present invention is to provide a new and improved dual, reinforcing-lead threaded fastener wherein the driving and insertion torque characteristics, as well as pull-out resistance characteristics, of the threaded fastener are optimally controlled.

A further object of the present invention is to provide a new and improved dual reinforcing lead threaded fastener which can be manufactured in a relatively simple and economical manner.

A last object of the present invention is to provide a new and improved dual reinforcing lead threaded fastener wherein the driving and insertion torque characteristic of the threaded fastener is substantially reduced such that the torsional strength characteristics of the material from which, the threaded fasteners are fabricated, are not exceeded so as to effectively eliminate fracture, rupture, and separation of the driving head portion of the threaded fastener from the threaded shank portion of the threaded fastener which has already been driven and inserted into the underlying substrate whereby enhanced penetration of the threaded fastener into the underlying substrate, to the desired or required depth, is able to be achieved.

SUMMARY OF THE INVENTION

The foregoing and other objectives are achieved in accordance with the teachings and principles of the present invention through the provision of a new and improved dual reinforcing lead threaded fastener which comprises a first, primary thread lead, and a pair of second, auxiliary thread leads alternatively interposed between successive threads of the first, primary thread lead. The threaded fastener further comprises a pointed tip portion for initiating driving insertion of the threaded fastener into an underlying workpiece or substrate, and in accordance with the principles and teachings of the present invention, that portion of the dual reinforcing lead, which has previously been interposed between the tip portion and the primary thread lead, or between the first and second successive threads of the first primary thread lead, has been removed. In this manner, a circumferentially extending space is effectively created for permitting chips or debris, normally generated during the self-tapping of the threaded fastener into a bore previously pre-drilled within the underlying workpiece or substrate, to be temporarily accumulated within such circumferential space whereby such chips or debris can subsequently be automatically discharged from such space into the depths of the pre-drilled bore as threaded insertion of the threaded fastener into the pre-drilled bore of the workpiece or substrate continues or proceeds. Such accommodation of the debris reduces insertion torque levels and permits enhanced penetration of the fastener into the workpiece or substrate. In addition, the thread leads can be provided with boss or lobe members, and base portions, which can be varied in their particular structural features such that the insertion torque and pull-out resistance characteristics of the fasteners can effectively be tailored in connection with the use or disposition of the fasteners within particular substrate materials.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 6 is a schematic plan view of a pair of thread leads, as may be provided upon the fastener as disclosed within FIG. 1, wherein the leads are disclosed as comprising base portions and boss or lobe members which may have variable width dimensions as considered in the longitudinal direction along each one of the thread leads;

FIG. 7 is a plan view showing the fabrication of an electric-discharge machining (EDM) tool for use in connection with the formation of die structure which will, in turn, be utilized to fabricate the threaded fasteners of the present invention from fastener blank members;

FIG. 8 is a schematic plan view of a thread rolling die which has been fabricated by means of the electric-discharge machining (EDM) tool illustrated within FIG. 7 and which is accordingly provided with parallel sets of relatively deep recesses and relatively shallow recesses in order to, in turn, respectively form the boss or lobe members, and the base sections, upon a fastener blank in order to fabricate the threaded fastener of the present invention;

FIG. 9 is a flow chart illustrating the processing steps utilized to form the electric-discharge machining (EDM) tool, the use of the electric-discharge machining (EDM) tool to form a corresponding thread rolling die, the formation of a fastener blank, and the use of the thread rolling die to roll threads upon the fastener blank in order to fabricate the threaded fastener of the present invention;

FIG. 10 is a perspective view similar to that of FIG. 1 showing, however, a second embodiment of a new and improved threaded fastener, constructed in accordance with the principles and teachings of the present invention, wherein the threaded fastener is provided with a single thread lead;

FIG. 11 is a graphical plot showing the insertion torque characteristics of the fastener shown in FIG. 1 as a function of the depth level to which the fastener is inserted into a substrate material;

FIG. 15 is a top plan view of a conventional PRIOR ART thread rolling die;

FIG. 16 is a side elevational view of a pair of conventional PRIOR ART thread rolling dies, of the type illustrated within FIG. 15, showing the use of the same in performing a thread rolling process in conjunction with a blank member interposed between the pair of conventional PRIOR ART thread rolling dies;

FIG. 17 is a perspective view, partly in cross-section, of the conventional PRIOR ART thread rolling die illustrated within FIG. 15;

DETAILED DESCRIPTION OF THE PREFERRED EMBODIMENT

Figure 1:
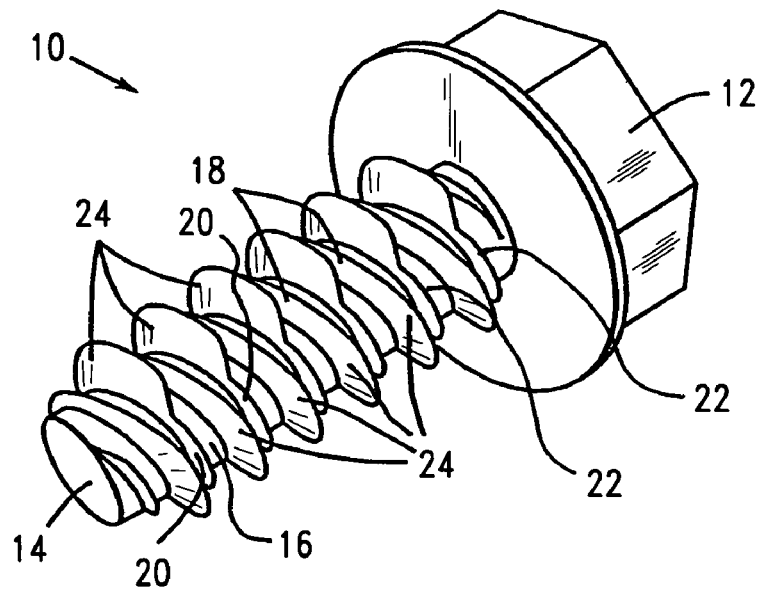
FIG. 1 is a perspective view of a first embodiment of a new and improved threaded fastener constructed in accordance with the principles and teachings of the present invention, wherein the threaded fastener is provided with dual thread leads.

Referring now to the drawings, and more particularly to FIG. 1 thereof, a new and improved fastener, constructed in accordance with the principles and teachings of the present invention, is disclosed and is generally indicated by the reference character 10. The fastener 10 is seen to comprise a head portion 12 formed upon one end thereof, a tip portion 14 formed upon an opposite end thereof, and a threaded shank portion 16. While the head portion 12 is illustrated as having a hexagonally shaped external configuration, the head portion 12 may have any suitable external configuration, and in a similar manner, while the tip portion 14 is disclosed as having a diametrical extent which is substantially equal to that of the threaded shank portion 16, the tip portion 14 may profiled or have alternative structural characteristics which facilitates the insertion of the tip portion 14, and the fastener 10, into particular substrate materials. The fastener 10 is seen to further comprise one or more leads which are uniquely structured in accordance with the principles and teachings of the present invention, and more particularly, as illustrated in FIG. 1, two such leads 18, 20, having substantially similar or identical configurations, are disposed upon the threaded shank portion 16.

Figure 1A:
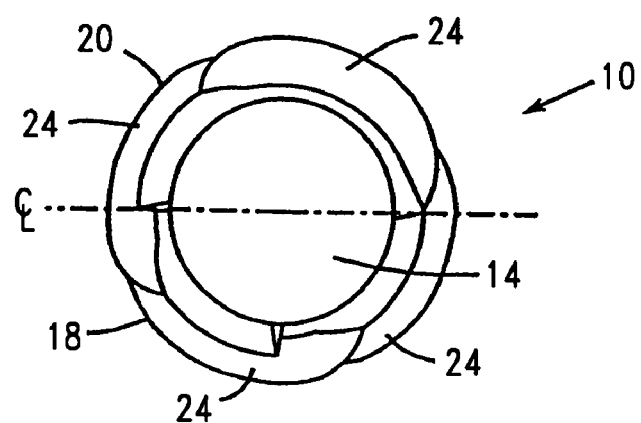
FIG. 1A is a cross-sectional view of the new and improved fastener as disclosed within FIG. 1 showing the relative angular dispositions of the boss or lobe members as disposed upon the two different thread leads of the fastener.

Each lead 18, 20 comprises a continuous base portion 22, and a plurality of boss or lobe members 24 extending substantially radially outwardly from the base portion 22, it being further appreciated that the leads 18, 20 are effectively offset with respect to each other through means of a circumferentially angular displacement of approximately 180°. Accordingly, as disclosed within FIG. 1A, not only are, for example, two boss or lobe members 24 disposed upon each one of the leads 18, 20 within each angular or circumferential extent of 360°, but it is additionally noted that the boss or lobe members 24 of one of the leads 18, 20 are disposed at predetermined angular positions which correspond to the predetermined angular positions at which recesses are formed upon the other one of the leads 18, 20. In this manner, the relative disposition of the boss or lobe members 24, as well as the recesses defined between adjacent boss or lobe members 24, upon both of the leads 18, 20, as well as the circumferentially angular displacement of the boss or lobe members 24 with respect to each other as respectively positioned upon the leads 18, 20, not only provides locations within which materials may settle or flow, but in addition, such structure optimizes the performance characteristics of the fastener such as, for example, insertion torque, pull-out resistance, and the like.

Figure 2:
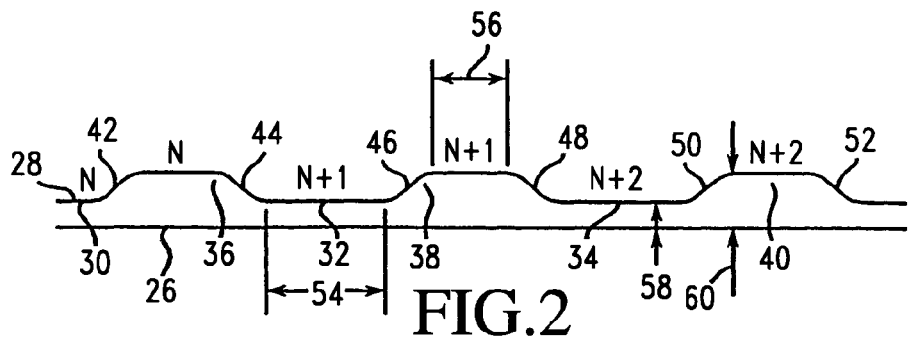
FIG. 2 is a schematic elevational view of either one of the two thread leads disclosing the serial arrangement of the base portions and the boss or lobe members along either one of the two threaded leads of the fastener as disclosed within FIG. 1.

With reference now being made to FIG. 2, the specific structural characteristics of an exemplary thread lead profile, for either one of the leads 18, 20 of the threaded fastener 10 as illustrated within FIG. 1, will now be described. More particularly, it is seen that, as schematically illustrated within FIG. 2, the thread lead profile comprises a thread roof portion 26 and a thread crest profile portion 28. The thread crest profile portion 28 comprises a plurality of base portions similar to the base portion 22 illustrated within FIGS. 1 and 10, as well as a plurality of boss or lobe members, similar to the boss or lobe members 24 as also illustrated within FIGS. 1 and 10, wherein the plurality of boss or lobe members are interposed between the plurality of base portions. For clarity purposes, in lieu of the plurality of serially arrayed base portions all being indicated by the sole reference character 22, it is noted that the plurality of base portions, that is, the three illustrated base portions, are denoted by means of the reference characters 30, 32, 34, and in addition, such base portions may be serially noted as N, N+1, N+2, and the like. In a similar manner, in lieu of the plurality of serially arrayed boss or lobe members all being indicated by the sole reference character 24, it is noted that the plurality of boss or lobe members, that is, the three illustrated boss or lobe members, are denoted by means of the reference characters 36, 38, 40, and in addition, such boss or lobe members may likewise be serially noted as N, N+1, N+2, and the like.

Still further, in addition to the plurality of base portions 30, 32, 34, as well as the plurality of boss or lobe members 36, 38, 40, transitional regions respectively interconnect the individual base portions 30, 32, 34 to the successive boss or lobe members 36, 38, 40. More particularly, it is seen that a lead-in transitional region 42 operatively interconnects base portion 30 and boss or lobe member 36, while a lead-out transitional region 44 operatively interconnects boss or lobe member 36 and base portion 32. In a similar manner, a lead-in transitional region 46 operatively interconnects base portion 32 and boss or lobe member 38, while a lead-out transitional region 48 operatively interconnects boss or lobe member 38 and base portion 34. Lastly, a lead-in transitional region 50 operatively interconnects base portion 34 and boss or lobe member 40, while a lead-out transitional region 52 operatively interconnects boss or lobe member 40 and the next base portion, not numbered. It is to be noted that while all of the base portions 30, 32, 34, the boss or lobe members 36, 38, 40, and the lead-in and lead-out regions 42, 44, 46, 48, 50, 52 are illustrated as being substantially similar, identical, or mirror images of each other, the structural characteristics, such as, for example, the length, height, form, profile, angle, and the like, may be varied along the length or longitudinal extent of each thread lead 18, 20 so as to effectively tailor the fastener 10 to specific applications which may require, for example, different or diverse insertion torque or pull-out resistance parameters or values.

For example, the length of each base portion 30, 32, 34 is exemplified by means of the noted length dimension 54, while the length of each boss or lobe member 36, 38, 40 is exemplified by means of the noted length dimension 56. In a similar manner, the height or depth of each base portion 30, 32, 34 is exemplified by means of the noted height or depth dimension 58, while the height or depth of each boss or lobe member 36, 38, 40 is exemplified by means of the noted height or depth dimension 60. These various dimensions may be altered along the length of each thread lead 18, 20, and as can best be appreciated by those skilled in the art, such alterations will affect the performance characteristics of the fastener 10. For example, as is well-known by the those who are skilled in the art, the lead-in profiles or configurations will affect the insertion torque characteristics of the fastener 10, while the lead-out profiles or configurations will affect the pull-out resistance characteristics of the fastener 10. Still further, it is to be noted that when more than one thread lead is provided upon the fastener 10, the sets of base portions and boss or lobe members disposed upon the multiple thread leads so as to be angularly oriented with respect to each other in accordance with predeterminedly desired patterns or modes so as to likewise achieve differently desired fastener performance characteristics. For example, as further illustrated within FIG. 3, a set of thread leads is disclosed at 62, 64, and it is seen that each one of the thread leads 62, 64 comprises serially arranged sets of base portions 30, 32, 34 and boss or lobe members 36, 38, 40. In addition, it is particularly noted that the serially arranged sets of base portions 30, 32, 34 and boss or lobe members 36, 38, 40 of, for example, the first the thread lead 62 are longitudinally offset with respect to the serially arranged sets of base portions 30, 32, 34 and boss or lobe members 36, 38, 40 of the second thread lead 64. In this manner, overlapped areas 66 are defined, for example, between the lead-in region 42 of the second thread lead 64 and the lead-out region 44 of the first thread lead 62, and between the lead-out region 44 of the second thread lead 64 and the lead-in region 46 of the first thread lead 62. In addition, separated regions 68, that is, those regions where the boss or lobe members 36, 38, 40 of the two thread leads 62, 64 do not overlap, are likewise defined between the two thread leads 62, 64. In this manner, for example, relatively uniform insertion torque characteristics can be attained as a result of the torque drive effectively being alternately shifted from one of the boss or lobe members 36, 38, 40 of one of the thread leads 62, 64 to one of the boss or lobe members 36, 38, 40 of the other one of the thread leads 62, 64 as the fastener 10 is driven into a substrate material. Additionally, the longitudinally offset lead-out regions 44, 48, 52 of the two thread leads 62, 64 cooperate together so as to enhance the pull-out resistance properties characteristic of the fastener 10.

As has been alluded to hereinbefore, not only can the various length, height, form, profile, angle, and the like, characteristics of the base portions 30, 32, 34, the boss or lobe members 36, 38, 40, and the lead-in and lead-out regions 42, 44, 46, 48, 50, 52 of each thread lead be predeterminedly formed upon any particular fastener 10, but in addition, the various length, height, form, profile, angle, and the like, characteristics of the base portions 30, 32, 34, the boss or lobe members 36, 38, 40, and the lead-in and lead-out regions 42, 44, 46, 48, 50, 52 of each individual thread lead can be predeterminedly formed such that the various length, height, form, profile, angle, and the like, characteristics of the base portions 30, 32, 34, the boss or lobe members 36, 38, 40, and the lead-in and lead-out regions 42, 44, 46, 48, 50, 52 of the thread leads as formed upon the particular fastener 10 can vary between thread leads, that is, from one thread lead to another thread lead. Still further, the various length, height, form, profile, angle, and the like, characteristics of the base portions 30, 32, 34, the boss or lobe members 36, 38, 40, and the lead-in and lead-out regions 42, 44, 46, 48, 50, 52 of each thread lead may be predeterminedly formed upon any particular fastener 10 such that the length, height, form, profile, angle, and the like, characteristics of the base portions 30, 32, 34, the boss or lobe members 36, 38, 40, and the lead-in and lead-out regions 42, 44, 46, 48, 50, 52 of each thread lead may vary along or within each thread lead.

Figure 3:
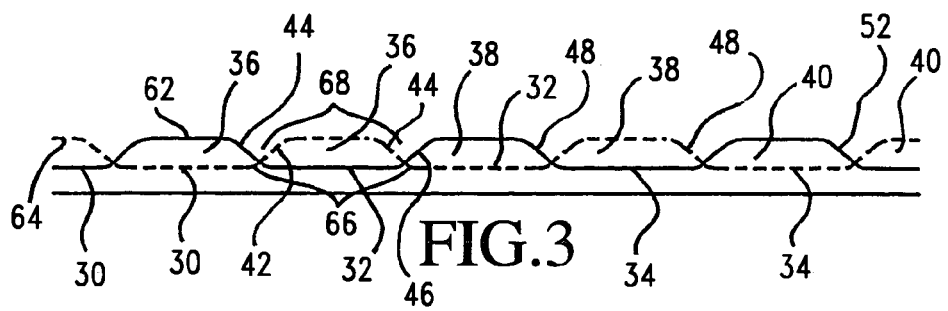
FIG. 3 is a schematic elevational view showing a pair of thread leads wherein the base portions and boss or lobe members of the two thread leads are longitudinally offset with respect to each other such that overlapped and spaced regions, as defined between the base portions and boss or lobe members of the two thread leads, exist between the thread leads.
Figure 4:
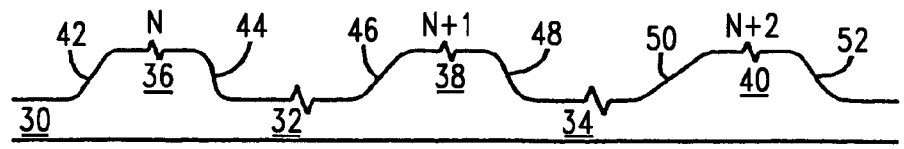
FIG. 4 is a schematic elevational view similar to that of FIG. 2 wherein, for example, length and incline variations, in connection with the lead-in and lead-out regions of the thread profile, are illustrated.
Figure 5:
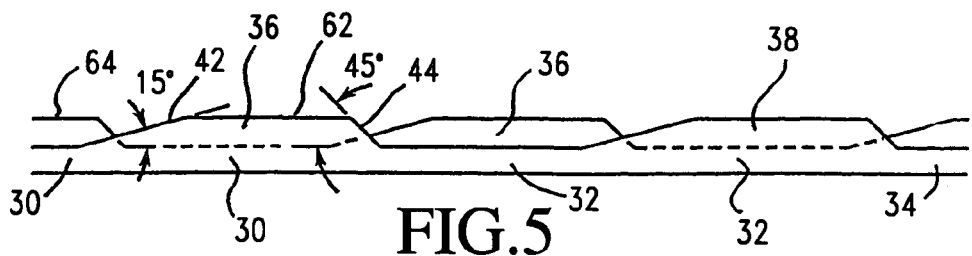
FIG. 5 is a schematic elevational view similar to that of FIG. 3 wherein the base portions and boss or lobe members of the two thread leads are longitudinally offset with respect to each other, however, the lead-in and lead-out regions may have different inclined or sloped angular characteristics.

More particularly, as illustrated within FIG. 4, there is shown a thread lead profile wherein the base portions are again illustrated at 30, 32, 34, and the boss or lobe members are again illustrated at 36, 38, 40. The lead-in regions are disclosed at 42, 46, 50, and the lead-out regions are disclosed 44, 48, 52. It is apparent that the angular extents or slopes, as well as the length dimensions, of the lead-in regions 42, 46, 50 vary from one to another, and in a similar manner, the angular extents or slopes, as well as the length dimensions, of the lead-out regions 44, 48, 52 also vary from one to another. Accordingly, different performance characteristics or properties, such as, for example, torque insertion and pull-out resistance, are able to be imparted to the fastener 10. In a similar manner, as can be appreciated from FIG. 5, there is disclosed a dual thread lead profile similar to that as illustrated within FIG. 3 wherein the serially arranged sets of base portions 30, 32, 34 and boss or lobe members 36, 38, 40 of, for example, the first the thread lead 62 are longitudinally offset with respect to the serially arranged sets of base portions 30, 32, 34 and boss or lobe members 36, 38, 40 of the second thread lead 64.

In addition, however, and contrary to the thread profiles as disclosed within FIG. 3, it is seen that the lead-in portion 42 of the thread lead 62 has an inclined angular orientation of 15° while the lead-out portion 44 of the thread lead 62 has an inclined angular orientation of 45°. Accordingly, the provision of the relatively shallow lead-in angle of 15° facilitates the insertion of the fastener 10 into a substrate material, whereas the provision of the relatively steep lead-out angle of 45° enhances pull-out resistance for the fastener 10. Consequently, by varying the structural characteristics of, for example, the lead-in regions 42, 46, 50, and the structural characteristics of, for example, the lead-out regions 44, 48, 52, different operating characteristics can be imparted to the fastener 10 for use in connection with different substrates or under different applications.

Continuing further, and with additional reference being made to FIG. 6, a pair of thread leads 62, 64, similar to the longitudinally offset thread leads as disclosed within FIG. 3, are disclosed wherein accordingly, the base portions 30, 32, 34 and the boss or lobe portions 36, 38 are illustrated. In lieu of, or in addition to, the fact that the base portions 30, 32, 34 and the boss or lobe portions 36, 38 may have predetermined fixed or variable height or depth dimensions, the base portions 30, 32, 34 and the boss or lobe portions 36, 38 may also have predetermined fixed or variable width dimensions. More particularly, as illustrated within FIG. 6, the particularly configured longitudinal profiles 70, 70 for the two thread leads 62, 64 comprises the base portions 30, 32, 34 which may have a fixed width dimension 71, while the boss or lobe members 36, 38 may have a fixed width dimension 72. Alternatively, the width dimensions of the base portions 30, 32, 34, as well as the width dimensions of the boss or lobe members 36, 38, may be varied. In addition, it is seen that the width dimensions of the lead-in regions 42, 46, and the lead-out regions 44, 48, as exemplified by means of the respectively circled areas 74, 76, are in fact varied in their width dimensions. As a result of such profiles or forms, the various operational performance characteristics of the fastener 10, such as, for example, insertion torque and pull-out resistance, may be optimally controlled or predetermined. It is also to be noted that various techniques may be employed in connection with the actual manufacture of the fasteners 10 so as to readily provide the fasteners 10 with the various aforenoted structural features or characteristics thereof as have been disclosed and described in connection with FIGS. 1–6.

In accordance with the principles and teachings of the present invention, electric-discharge machining (EDM) techniques comprise the preferred mode or technique for creating dies which will then be utilized to roll cylindrical blanks into the threaded fasteners 10 having the desired features or characteristics. In particular, the electric-discharge machining (EDM) techniques are initially utilized to fabricate a tool which will, in turn, be utilized to fabricate a corresponding die having the various desirable structural features or characteristics of the thread leads to be formed upon the fastener blanks. As disclosed within FIG. 7, an electric-discharge machining (EDM) tool 78 comprises a suitable material, such as, for example, graphite, for undergoing electric-discharge machining (EDM) processing. The tool 78 comprises a plurality of boss or lobe members 80, which are similar to or correspond with the boss or lobe members to be formed upon the fastener blank, and a plurality of base portions 82 which are similar to or correspond with the base portions to be formed upon the fastener blank. The formation of the boss or lobe members 80 and the base portions 82 upon the electric-discharge machining (EDM) tool 78 may be accomplished by any suitable means, such as, for example, milling operations or techniques, and as illustrated within FIG. 7, end milling tool pads 84, 86, 88, 90 are in fact used to form the aforenoted boss or lobe members 80 as well as the base portions 82 at predetermined locations upon the tool 78.

Continuing a step further, and with reference being made to FIG. 8, there is illustrated a thread rolling die 92 which has been fabricated in accordance with electric discharge machining (EDM) techniques utilizing the tool 78 as disclosed within FIG. 7. As is known in the art, the thread rolling die 92 is seen to comprise a sharpening section 94 and a thread forming or thread rolling section 96. The various structural features or elements incorporated within the thread rolling die 92 comprise, in effect, mirror images or reverse structural features or elements of those structural features or elements which are to be ultimately formed upon or within each one of a plurality of fastener blanks in order to fabricate the threaded fasteners 10.

More particularly, it is seen that, as a result of utilizing the tool 78 as disclosed within FIG. 7, and which has been fabricated in accordance with the principles and teachings of the present invention, parallel sets of linearly aligned, relatively deep recesses 98 are formed within the die 92, while in addition, parallel sets of linearly aligned, relatively shallow recesses 100 are likewise formed within the die 92 so as to be interposed between successive ones of the linearly aligned relatively deep recesses 98. As is also well-known in the art, thread rolling dies are typically employed in pairs wherein a first one of the dies is maintained stationary while a second one of the dies is movable with respect to the first stationary die so as to effectively cause the fastener blank to be rolled between the dies whereby the threads are formed upon the fastener blank so as to fabricate the threaded fastener. Accordingly, when the die 92 is utilized to form the unique threads, characteristic of the threaded fastener 10 of the present invention, upon a fastener blank, the relatively deep recesses 98 will effectively serve to form the boss or lobe members 36, 38, 40 of the fastener 10, while the relatively shallow recesses 100 will effectively serve to form the base sections 30, 32, 34 of the fastener 10.

With reference now being made to FIG. 9, the foregoing processing steps, comprising the formation of the electric-machining discharge (EDM) tool 78 as illustrated within FIG. 7, the formation of the die member 92, as illustrated within FIG. 8, by means of the electric-machining discharge (EDM) tool 78, and the formation of the thread profiles upon fastener blanks by means of the die member 92, as illustrated within FIG. 8, in conjunction with a mating die member, not shown, may be further understood as a result of the illustrated flow chart. More particularly, the overall fabrication method is generally indicated by the reference character 102 and is seen to commence with the machining of the electric-discharge machining (EDM) tool 78 as denoted by means of the flow chart block or step 104. As has been noted hereinbefore, such machining of the electric-discharge machining (EDM) tool 78 can be performed in accordance with any suitable machining process or technique, such as, for example, milling, and in accordance with the method step denoted at flow chart block or step 106, the thread rolling die 92 is formed by means of plunge electric-discharge machining (EDM) processes or techniques so as to create the relatively deep and relatively narrow thread forming recesses 98, 100 upon the die 92 as disclosed within FIG. 8. Still further, fastener blanks are formed at the flow chart block or step 108, the fastener blanks comprising, for example, as is well known in the art, unthreaded cylindrical rods having predetermined diametrical and axial extents. In this manner, when the thread profiles are to be formed upon the fastener blanks by means of suitable thread-rolling techniques, sufficient material is present to permit the fastener blank material to effectively be upset and redistributed as determined by means of the thread rolling die structure. Finally, as schematically illustrated at step 110 of the flow chart 102, the fastener blanks are interposed between the thread rolling dies whereby the predetermined thread profiles of, for example, thread rolling die 92, as disclosed within FIG. 8, are impressed upon the fastener blanks so as to form the threaded fasteners 10.

With reference now being made to FIG. 10, a second embodiment of a threaded fastener, as constructed in accordance with the principles and teachings of the present invention, is disclosed. It is noted that the only significant difference between the threaded fastener 10 as disclosed within FIG. 10 and the threaded fastener 10 as disclosed within FIG. 1 resides in the fact that the threaded fastener 10 as disclosed within FIG. 10 comprises a single thread lead. In particular, the threaded fastener 10 as disclosed within FIG. 10 comprises all of the structural features or characteristics as those incorporated within the threaded fastener 10 as disclosed within FIG. 1 except for the fact that all of such structural features or characteristics have been incorporated within or upon the single thread lead. Accordingly, in lieu of the reference characters 18, 20 effectively denoting the separate thread leads upon the threaded fastener 10 as disclosed within FIG. 10, the reference characters 18, 20 simply refer to alternative or successive threads of the single thread lead. It is additionally noted that otherwise, the performance characteristics or properties of the threaded fastener 10 as disclosed within FIG. 10 are comparable to those of the threaded fastener 10 as disclosed within FIG. 1, that is, as a result of the incorporation of such structural features or characteristics within or upon the threaded fastener 10 as disclosed within FIG. 10, such threaded fastener 10 does exhibit favorable insertion torque capabilities and enhanced pull-out resistance values.

In connection with the insertion torque capabilities, and with reference being made to FIG. 11, there is illustrated a graphical plot of insertion torque as a function of angular rotation attendant the depth insertion of the threaded fastener 10, having the dual thread leads 18, 20 as disclosed within FIG. 1, into a substrate material. As illustrated upon the graphical plot of FIG. 11, reference 120 represents a torque curve which is representative of insertion torque levels as the fastener 10 is inserted into a substrate material. More particularly, it is seen that as the fastener 10 is initially inserted into the substrate material, the torque level is at a substantially low value 122, and thereafter, the torque level increases at a substantially low, constant rate as depicted by means of that portion of the torque curve denoted by reference character 124. While some increase in torque levels may be momentarily encountered as the boss or lobe members 24 enter into the substrate material, it has been experienced that such changes in the insertion torque levels are extremely minimal. It is also noted from the graphical plot that the fastener 10 exhibits excellent pull-out resistance characteristics. In particular, it has been experienced that ratios in excess of 1:1, that is, the ratio of pull-out resistance with respect to insertion torque, can be obtained with the fasteners 10 constructed in accordance with the principles and teachings of the present invention. More particularly, while conventional fasteners may exhibit ratios on the order of 0.8:1, tests have indicated that dual-lead fasteners 10 constructed in accordance with the principles and teachings of the present invention can obtain ratios on the order of 1.1:1 and higher when inserted within substrate materials comprising, for example, nylon.

Continuing further, and in addition to the foregoing, the performance characteristics of a lead form can also be defined, controlled, or predetermined by means of the height and width dimensions of the various portions of the lead form, as well as by the respective rates of change of such portions of the lead form. Accordingly, as disclosed within FIGS. 12–14, an alternative embodiment of a lead form for a threaded fastener is generally indicated by the reference character 130, and it is seen that in accordance with such lead form 130, the heights and widths of various portions of the lead form 130, as well as the respective rates of change of such portions of the lead form 130, are in fact varied. More particularly, it is appreciated that the lead form 130 effectively comprises two symmetrical portions 132 which are disposed upon opposite lateral sides of the lead form 130, as considered along the longitudinal extent of the lead form 130, as best seen in FIG. 13, although, alternatively, the lead form 130 can be non-symmetrical. As disclosed, the lead form 130 comprises an alternating serial array of boss or lobe members 134, and a serial array of base portions 136, wherein the plurality of boss or lobe members 134 effectively extend laterally outwardly with respect to the base portions 136. The serial array of base portions 136 effectively serves as a longitudinally extending rib member for effectively strengthening the lead form 130, as defined by means of the serial array of boss or lobe members 134, and does not substantially interact with a workpiece or substrate as the fastener 10 is threaded into the workpiece or substrate. It is additionally noted that the serial array of base portions 136 provides spaces for accommodating the flow of fastener material during the thread rolling process, while the boss or lobe members 134 formed along the shank of the fastener 10 are positioned with respect to each other so as to provide a predetermined pattern for entry and exit of the boss or lobe members 134 into a workpiece or substrate.

Figure 12:
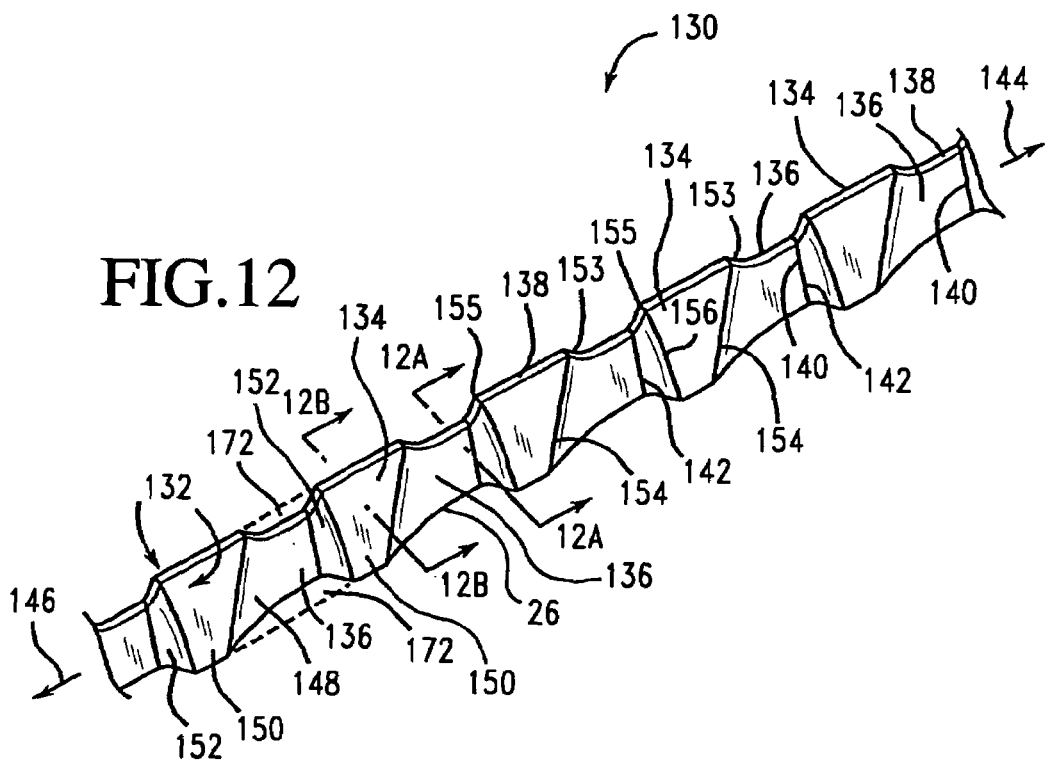
FIG. 12 is a perspective view of a thread lead form wherein the heights and widths of various portions of the lead form, as well as the respective rates of change of such portions of the lead form, are in fact varied.
Figure 13:
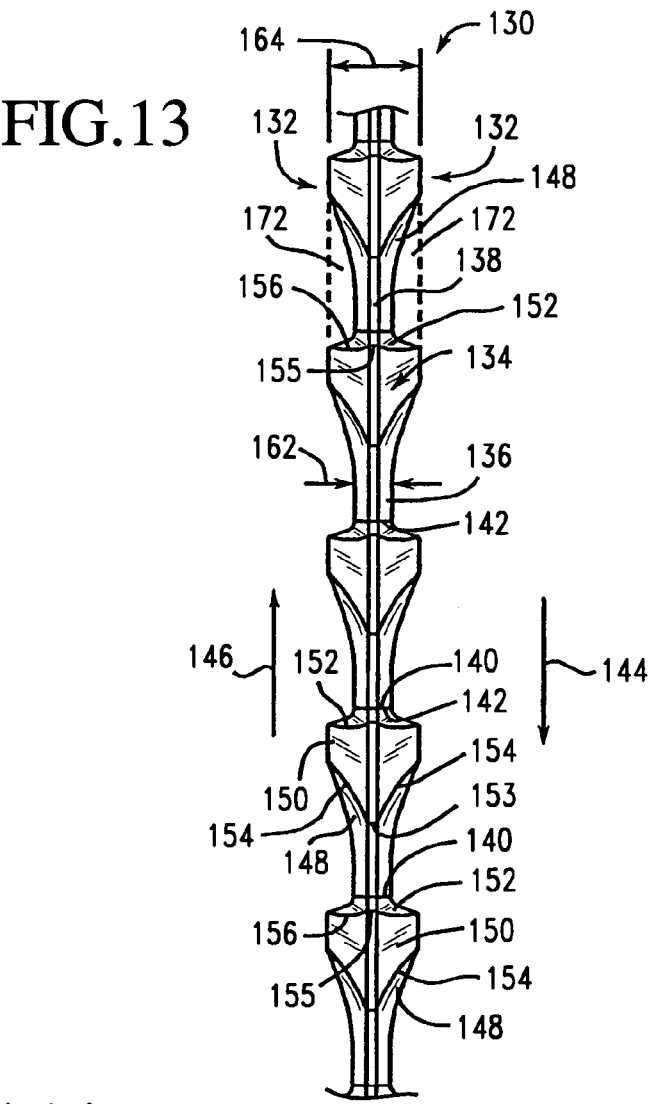
FIG. 13 is a top plan view of the thread lead form as disclosed within FIG. 12.
Figure 14:
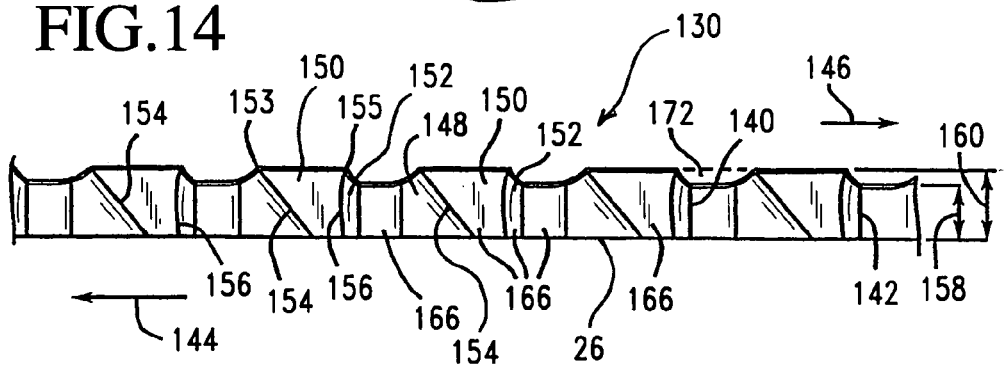
FIG. 14 is a side elevational view of the thread lead form as disclosed within FIG. 12.

With reference continuing to be made to FIGS. 12–14, it is seen that each boss or lobe member 134 has a corresponding base portion 136 operatively associated therewith, and that each boss or lobe member 134, and each base portion 136, has a crest portion 138. In addition, as may best be appreciated from FIG. 13, the paired combination of each boss or lobe member 134 and its corresponding base portion 136 together define a thread lead unit which has, for example, a first end portion 140 and a second end portion 142. In this manner, it can be appreciated that the first end portion 140 of a one thread lead unit, comprising a particular boss or lobe member 134 and its corresponding base portion 136, effectively shares or defines an interface with the second end portion 142 of another one of the thread lead units comprising another boss or lobe member 134 and its corresponding base portion 136. It is noted, as can best be appreciated from FIG. 13, that each one of the thread lead units, comprising a particular boss or lobe member 134 and its corresponding base portion 136, effectively has the configuration of an arrowhead. It is to be noted still further that the threaded fastener 10 can be manufactured in such a manner that the thread lead form 130 may have different orientations with respect to the shank portion 16 of the fastener 10 and the longitudinal axis thereof.

More particularly, in accordance with a first orientation, the fastener 10 may be manufactured in such a manner that the lead form 130 extends helically around the shank portion 16 of the fastener 10 and that the first end portions 140 are oriented toward the tip portion 14 of the fastener 10, while in accordance with a second orientation, the fastener 10 may be manufactured in such a manner that the lead form 130 extends helically around the shank portion 16 of the fastener 10 in the opposite direction and that the second end portions 142 are oriented toward the tip portion 14 of the fastener 10. In this manner, when the fastener 10 is manufactured in accordance with the first orientation, it has been experienced that the fastener 10 exhibits desirable insertion characteristics with respect to certain substrate materials, such as, for example, concrete, whereas when the fastener 10 is manufactured in accordance with the second orientation, it has been experienced that the fastener 10 exhibits desirable insertion characteristics with respect to certain substrate materials other than concrete, such as, for example, aluminum and other hard materials. Still further, it will be appreciated that when the fastener 10 is manufactured such that the lead form 130 is disposed thereon in its first orientation, the lead form 130 will propagate, during the insertion thereof into the substrate material, in a first direction denoted by means of the arrow 144, whereas, when the fastener 10 is manufactured such that the lead form 130 is disposed thereon in its second orientation, the lead form 130 will propagate, during the insertion thereof into the substrate material, in a second opposite direction denoted by means of the arrow 146.

In light of the foregoing, it is to be additionally appreciated that regardless of the orientation of the lead form 130 upon the fastener 10 whereby either the first end portions 140 are oriented toward the tip portion 14 of the fastener 10, or alternatively, the second end portions 142 are oriented toward the tip portion 14 of the fastener 10, and therefore, regardless of which end portions 140, 142 are oriented toward the tip portion 14 of the fastener 10 as the fastener 10 is inserted into the substrate material, the boss or lobe members 134 of the lead form 130 are accordingly provided with suitable cutting members or cutting surfaces whereby the boss or lobe members 134 can cut into the substrate material in either one of first and second oppositely oriented directions. More particularly, as can best be appreciated from FIGS. 12, 13, and 14, each boss or lobe member 134 comprises a first end portion 148, a second intermediate portion 150, and a third end portion 152. The first end portion 148 is the lead-in portion of the boss or lobe member 134 and the third end portion 152 is the lead-out portion of the boss or lobe member 134 when the lead form 130 is oriented in accordance with the first aforenoted orientation.

More particularly, when the lead form 130 is disposed or oriented in accordance with the first aforenoted orientation, the first end portion 148 and the second intermediate portion 150 of each boss or lobe member 134 combine to form a first cutting tip 153 along the crest 138 of the lead form 130, and the first and second end portions 148, 150 also serve to define first cutting edges 154. The first cutting edges 154 extend from the first cutting tip 153 toward the root 26 of the thread upon each symmetrical portion 132 of the lead form 130. The first cutting tip 153 maintains its point or edge as the second intermediate and third end portions 150, 152 of the boss or lobe member 134 are worn during insertion of the fastener 10 into the substrate material, and the first cutting edges 154 are used for tapping the substrate material. In the illustrated embodiment, it is noted that the first cutting edges 154 extend from the root 26 of the thread to the crest portion 138 of the thread and are inclined toward the first direction of propagation 144 of the lead form 130 as best seen in FIGS. 12, 13, and 14. In addition, it is noted that in this embodiment, the first cutting edges 154 are somewhat curved because of the generally non-linear shape of the third end portion 152 and the generally linear shape of the second intermediate portion 150.

Continuing further, and conversely, when the lead form 130 is disposed or oriented in accordance with the second aforenoted orientation, the third end portion 152 of each boss or lobe member 134 comprises the lead-in portion, while the first end portion 148 of each boss or lobe member 134 comprises the lead-out portion. In addition, as was the case with the first end portion 148 and the second intermediate portion 150 of each boss or lobe member 134 combining to form the first cutting tip 153, along the crest 138 of the lead form 130, and the first cutting edges 154, when the lead form 130 was disposed or oriented in accordance with the first aforenoted orientation, the second intermediate portion 150 and the third end portion 152 of each boss or lobe member 134 similarly combine to form a second cutting tip 155, along the crest 138 of the lead form 130, and second cutting edges 156, when the lead form 130 is disposed or oriented in accordance with the second aforenoted orientation.

Accordingly, when the lead form 130 is disposed or oriented in accordance with the second aforenoted orientation, the second cutting tip 155 and the second cutting edges 156 comprise cutting surfaces, and it is likewise seen that the second cutting edges 156 extend from the second cutting tip 155 toward the root 26 of the thread upon each one of the laterally symmetrical portions 132 of the lead form 130. It is thus seen that as a result of the provision of the plurality of boss or lobe members 134 along the length of the fastener 10, and the provision of the dual sets of reversely oriented cutting tips 153, 155 and cutting edges 154, 156, cutting tips and cutting edges are able to be presented to the substrate material, as the fastener 10 is inserted into the substrate material, regardless of the orientation of lead form 130 disposed upon the fastener 10.

Figures 12A, 12B:
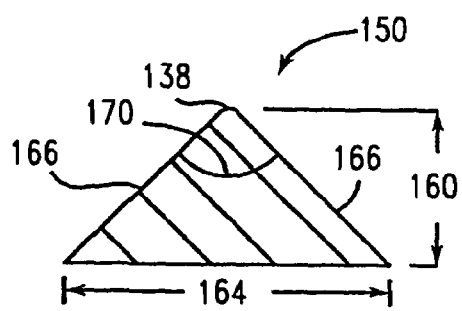
FIG. 12A is a cross-sectional view of the thread lead form as disclosed within FIG. 12 and as taken along the lines 12A—12A of FIG. 12.
FIG. 12B is a cross-sectional view of the thread lead form as disclosed within FIG. 12 and as taken along the lines 12B—12B of FIG. 12.

With reference now being additionally made to FIGS. 12A and 12B, it will be further appreciated that, in accordance with the various principles and teachings of the present invention, the height and width dimensions of the lead form 130 will vary at different axial positions along the lead form 130, and this is particularly the case when the structural configurations of the boss or lobe members 134, and the structural configurations of the base portions 136, are compared. More particularly, as can best be appreciated, for example, from FIGS. 12A and 12B, the crest portion 138 of the lead form 130 has a first height dimension 158 when taken at an axial position along the lead form 130 which corresponds to that of one of the base portions 136, while in a similar but different manner, the crest portion 138 of the lead form 130 has a second height dimension 160 when taken at an axial position along the lead form 130 which corresponds to that of one of the second intermediate portions 150 of one of the boss or lobe members 134. The first height dimension 158, as taken at the axial position along the lead form 130 which corresponds to that of one of the base portions 136, is less than the second height dimension 160 as taken at the axial position along the lead form 130 which corresponds to that of one of the second intermediate portions 150 of one of the boss or lobe members 134, and accordingly, the second height dimension 160 defines the outer crest diameter of the threaded fastener 10. As may be best appreciated from FIGS. 12 and 14, it is to be noted that the height dimension of the crest portion 138 increases in the direction proceeding from the first end portion 148 of each boss or lobe member 134 toward the second intermediate portion 150 of the boss or lobe member 134, and it is noted further that such a change in the height dimension is preferably non-linear, at least within that region of the first end portion 148 which is disposed immediately adjacent to the second intermediate portion 150. The reason for this is that a non-linear change in the height dimension produces a sharper cutting point or tip 153 than would otherwise be able to be achieved with a linear change in the height dimension. In a similar manner, it is likewise appreciated that the height dimension of the crest portion 138 decreases in the direction proceeding from the third end portion 152 of each boss or lobe member 134 toward the adjacent base portion 136, and it is noted further that such a change in the height dimension is also preferably non-linear. Still further, it is noted that the rate of change in the height dimension of the third end portion 152 of each boss or lobe member 134 is greater than the rate of change in the height dimension within the first end portion 148 of each boss or lobe member 134. In this manner, different cutting characteristics are able to be imparted to the cutting points or cutting tips 153, 155.

With reference continuing to be made to FIGS. 12A and 12B, each base portion 136 is also seen to have a first width dimension 162, while the second intermediate portion 150 of each boss or lobe member 134 is also seen to have a second width dimension 164. The first width dimension 162 characteristic of each base portion 136 is less than the second width dimension 164 characteristic of each second intermediate portion 150 of each boss or lobe member 134, and as best illustrated in FIG. 13, the width dimension of each first end portion 148 of each boss or lobe member 134 increases in the direction proceeding toward the second intermediate portion 150 of each boss or lobe member 134. In particular, the rate of change in the width dimension of the first end portion 148 of each boss or lobe member 134 is preferably non-linear. In a similar manner, it is noted that the width dimension of the third end portion 152 of each boss or lobe member 134 decreases in the direction proceeding toward the base section 136 which is disposed immediately adjacent to the particular third end portion 152 of the boss or lobe member 134.

In particular, the rate of change in the width dimension of the third end portion 152 of each boss or lobe member 134 is also preferably non-linear. In accordance with the principles and teachings of the illustrated fastener lead form 130, the rate of change in the width dimension of the third end portion 152 of each boss or lobe member 134 is also noted as being greater than that of the first end portion 148 of each boss or lobe member 134, thereby enabling further differences in the insertion torque and pull-out strength or resistance characteristics of the fastener 10 when the lead form 130 is disposed in either one of the first and second aforenoted orientations. It is also to be appreciated that as a result of the aforenoted width dimensions 164 of the boss or lobe members 134, as well as the width dimensions 162 of the base sections 136, and in light of the non-linear rates of change in the width dimensions of the lead form 130 as respectively defined between the first end portions 148 of the boss or lobe members 134 and the base sections 136, as well as between the third end portions 152 of the boss or lobe members 134 and the base sections 136, all of the serially arranged units of the lead form 130, as comprising the combination of a boss or lobe member 134 and an adjacent base section 136, has a substantially pointed or tapered configuration which substantially resembles the configuration of an arrowhead.

Continuing still further as a result of reference being made to FIGS. 12A and 12B, it is further seen that the outer surfaces of each base section 136 comprise a pair of symmetrically oriented faces 166, 166, while in a similar manner, the outer surfaces of each second intermediate portion 150 of each boss or lobe member 134 likewise comprise a pair of symmetrically oriented faces 166, 166. Accordingly, the cross-sectional configurations of the base sections 136, and the second intermediate portions of the boss or lobe members 134, substantially comprise isosceles triangles. In particular, it is seen that the included apex angle 168, as defined between the oppositely disposed faces 166, 166 of each base section 136, may comprise, for example, an angular extent of 30°, while in a similar manner, the included apex angle 170, as defined between the oppositely disposed faces 166, 166 of each second intermediate portion 150 of each boss or lobe member section 134, may likewise comprise, for example, an angular extent of 30°. It is of course additionally noted that such angular extents 168, 170 may have values other than the noted 30°, and in addition, the included angles as defined between the oppositely disposed outer surfaces of the first and third end portions 148, 152 of each boss or lobe member 134 may also vary or be different from the particular angle value characteristic of the included angle 170 defined between the opposite faces 166, 166 of the second intermediate portion 150 of each boss or lobe member 134.

As is also apparent from FIGS. 12 and 13, and due to the difference, for example, in the width dimensions 162 and 164 respectively characteristic of the base sections 136 and the boss or lobe members 134, a plurality of void volumes 172 are effectively defined externally of the outer side surfaces 166, 166 of each base section 136 and between the first and third end portion 148, 152 of successive ones of the boss or lobe members 134. These void volumes 172 effectively serve as repositories for debris produced or generated during the insertion of the threaded fastener 10 into the substrate material such that the noted debris does not negatively impact or affect the insertion torque required to drive the threaded fastener into the substrate material and to cut or tap threads within the substrate material. It is additionally noted that the relatively smaller height and width dimensions 158, 162 characteristic of each base section 136, as compared to the relatively larger height and width dimensions 160, 164 characteristic of each boss or lobe member 134, also serve to reduce the surface area, and resulting friction, defined between the threaded fastener 10 and the substrate material when the threaded fastener 10 is inserted into the substrate material, whereby, again, insertion torque levels are correspondingly reduced. In a similar manner, adjusting or varying the rate of change in the thickness dimensions of the first end portion 148 of each boss or lobe member 134 can also affect the insertion torque characteristics of the threaded fastener 10.

In connection with the fabrication of threaded fasteners, one method or technique for conventionally forming threaded fasteners comprises the rolling of a blank member between a pair of thread rolling dies as is disclosed, for example, within U.S. Pat. No. 4,716,751 which issued to Wozniak on Jan. 5, 1988. In accordance with such a conventional manufacturing method or technique for forming threaded fasteners, as illustrated, for example, within FIGS. 15–17, which correspond to FIGS. 1, 1a, and 2 of the aforenoted patent, a blank member 9 is adapted to be interposed between a pair of thread rolling dies 10, 10a wherein, for example, a first one of the thread rolling dies 10 comprises a moving die while the second one of the thread rolling dies 10a comprises a stationary die. Each one of the thread rolling dies 10, 10a comprises a tool steel body 11 having a working face 12, and, as best seen in FIGS. 15 and 17, and as described in connection with the thread rolling die 10, the working face 12 is provided with a plurality of die threads 13 which extend from a start end 14 of the thread rolling die 10 toward a finish end 16 of the thread rolling die 10, and which are disposed at a predetermined angle with respect to the axial or longitudinal extent or axis L of the thread rolling die 10 in order to in fact form the threads upon the blank member 9. As the blank member 9 is rolled between the two thread rolling dies 10, 10a from the start end 14 of the thread rolling die 10 toward the finish end 16 of the thread rolling die 10, the material comprising the blank member 9 is progressively displaced and flows into or between the thread rolling die threads 13 whereby fully formed threads, which mate with or correspond to the thread rolling die threads 13 of the thread rolling dies 10, 10a, are produced upon the blank member 9. More particularly, as can best be appreciated from FIG. 17, each one of the thread rolling die threads 13 comprises a plurality of crest portions 17, which are adapted to penetrate the blank member material during the thread rolling operation so as to effectively and ultimately form the root portions of the threads upon the blank member 9, and a plurality of root portions 19 which are adapted to ultimately form the crest portions of the threads upon the blank member 9 at the completion of the thread rolling operation. Lastly, flank portions 18 of the thread rolling die threads 13 define surfaces along which the blank member material flows during the formation of the crest and root portions of the threads upon the blank member 9, and the flank portions 18 of the thread rolling die threads 13 likewise form corresponding thread flank portions upon the blank member 9. It is further noted that as the rolling process proceeds, the material comprising the blank member continues to be displaced along the flank portions 18 of the thread rolling die threads 13 with the depth of penetration increasing as the rolling process continues until a fully formed thread is produced upon the blank member 9 at the finish ends 16 of the thread rolling dies 10, 10a.

Figure 18:
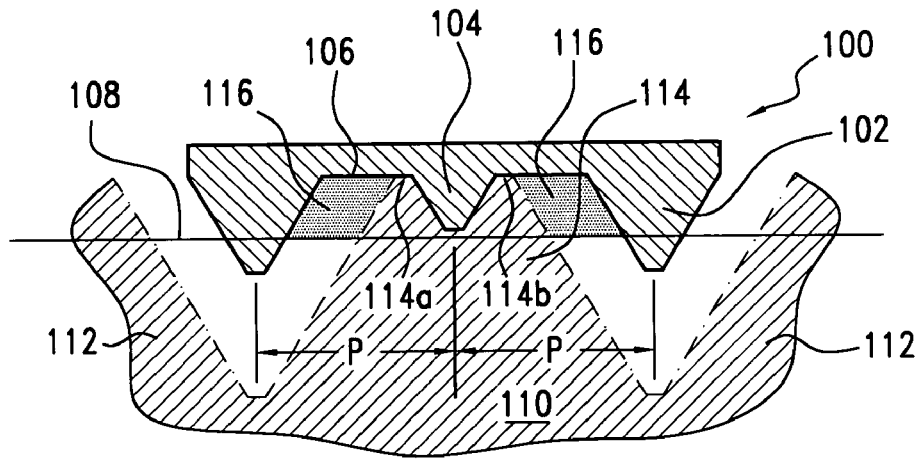
FIG. 18 is a schematic view showing one of a pair of conventional PRIOR ART thread rolling dies which is utilized for forming a conventional "hi-low" thread form upon a blank member, wherein the "hi-low" thread comprises a first, primary thread lead and a second, auxiliary thread lead, and wherein further, successive threads of the first, primary and second, auxiliary thread leads are formed at alternative axial positions along the blank member.

With reference now being made to FIG. 18, there is disclosed a conventional threaded fastener 100 which is known in the industry as a "hi-low" thread form in view of the fact that the same comprises two different thread leads, that is, a first, primary thread lead 102, and a second, auxiliary thread lead 104 which provides reinforcement characteristics to the threaded fastener 100. The primary and auxiliary thread leads 102, 104 are disposed upon the threaded fastener 100 in such a manner that successive portions of the auxiliary thread lead 104 are interposed between successive portions of the primary thread lead 102 along the axial extent of the threaded fastener 100, and it is particularly noted that the axial distance or pitch, as defined between each set of primary and auxiliary thread leads 102, 104, is denoted by P, while the axial distance or pitch, as defined between, for example, successive primary or successive auxiliary thread leads 102, 102 or 104, 104, is 2P.

The root portion of the threaded fastener 100 is disclosed at 106, and it is noted that the crest height of the first, primary thread lead 102, as measured from the root portion 106 of the threaded fastener 100, is adapted to be at least twice the crest height of the second, auxiliary thread lead 104 as similarly measured from the root portion 106 of the threaded fastener 100. One of a pair of thread rolling dies, for forming the primary and auxiliary thread leads 102, 104 upon a fastener blank member 108 in a manner similar to the aforenoted use of thread rolling dies 10, 10a in connection with the formation of the threads upon the fastener blank member 9, is disclosed at 110, and it is seen that in order to ultimately form the primary and auxiliary thread leads 102, 104 upon the fastener blank member 108, the thread rolling die 110 comprises a plurality of primary thread rolling die threads 112, and a plurality of auxiliary thread rolling die threads 114. In a manner corresponding to the alternative disposition of the first, primary thread leads 102 and the second, auxiliary thread leads 104 upon the threaded fastener 100, the plurality of primary thread rolling die threads 112 and the plurality of auxiliary thread rolling die threads 114 are similarly disposed in an alternative manner upon the thread rolling die 110.

More particularly, in connection with each one of the thread rolling die threads 114, it is seen that the crest portion of each auxiliary thread rolling die thread 114 actually comprises a pair of crest portions 114a, 114b, wherein each one of the crest portions 114a, 114b of each auxiliary thread rolling die thread has a lateral or transverse extent of between 0.003–0.010 inches, and wherein further, the crest portions 114a, 114b are laterally or transversely spaced from each other by means of a predetermined distance so as to in fact form each one of the second, auxiliary thread leads 104 therebetween during the thread rolling process. In particular, recalling the fact that the depth of penetration of the thread rolling dies increases as the thread rolling process continues, and appreciating the additional fact that each one of the thread rolling die threads 112, 114 is disposed at a predetermined angle with respect to the longitudinal or axial extent or axis of the thread rolling die 110, then it can be appreciated further that in order to fully form the first, primary thread lead 102 upon the threaded fastener 100, after the second, auxiliary thread lead 104 has been formed so as to have a predetermined depth, a predetermined amount of blank member material 116 must be displaced or moved a predetermined lateral or transverse distance during the thread rolling operation.

It is also conventionally known, however, that, in accordance with thread rolling manufacturing techniques, and the practical limitations inherently associated therewith, a predetermined amount of blank member material can only be displaced a predetermined distance during each rotation or revolution of the blank member along the pair of cooperating thread rolling dies in order to in fact achieve good, reliable, straight threads upon the blank member. Consequently, the greater the distance that the blank member material must be displaced, the greater the number of rotations or revolutions that the blank member must undergo during the thread rolling process until the thread leads are fully formed upon the original blank member. Accordingly, if the blank member must undergo a substantially large number of rotations or revolutions, then the longitudinal or axial length of each thread rolling die must be substantially large which, in turn, requires the use of a substantially large thread rolling machine which renders the manufacture of the threaded fasteners relatively costly. Since the practical problem in connection with the formation of, for example, the first, primary thread lead 102 upon the fastener blank member 108 resides in, or is a function of, the pitch spacing 2P between successive threads of the first, primary thread lead 102, and therefore the distance through which the blank material must be moved or displaced during the thread rolling process in order to form the successive threads of the first, primary thread lead 102, then one solution to this problem might be to shorten the pitch spacing between successive threads of the first, primary thread lead 102. The shortening of the pitch spacing between successive threads of the first, primary thread lead 102 would, however, increase the number of threads per inch that would be present upon the threaded fastener 100. This alteration in the number of threads per inch, as present upon the threaded fastener 100, however, adversely alters the operational characteristics of the threaded fastener 100, such as, for example, the amount of insertion torque required in connection with the driving of the threaded fastener into a substrate, the amount of time it takes to insert or drive the threaded fastener 100 into the substrate, the pull-out resistance of the threaded fastener 100 with respect to the substrate, and the like.

A need therefore existed in the art for a new and improved threaded fastener whereby the manufacturing process could be readily facilitated in view of the fact that, during the formation of the predetermined number of threads per inch comprising the thread leads of the threaded fastener in accordance with the thread rolling process, the blank member material only needed to effectively be displaced or moved through a smaller lateral or transverse distance in order to complete the formation of the thread leads upon the blank member such that, in turn, the longitudinal or axial length of the thread rolling dies could be substantially shortened so as to, in turn, require the use of a substantially shortened thread rolling machine which rendered the manufacture of the threaded fasteners more cost effective. This need or objective was in fact achieved by means of the threaded fastener, the thread rolling die, and the method of manufacture as disclosed within the aforenoted U.S. patent application entitled THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER, which was filed on Dec. 18, 2002, and which has been assigned Ser. No. 10/323,265.

Figure 19:
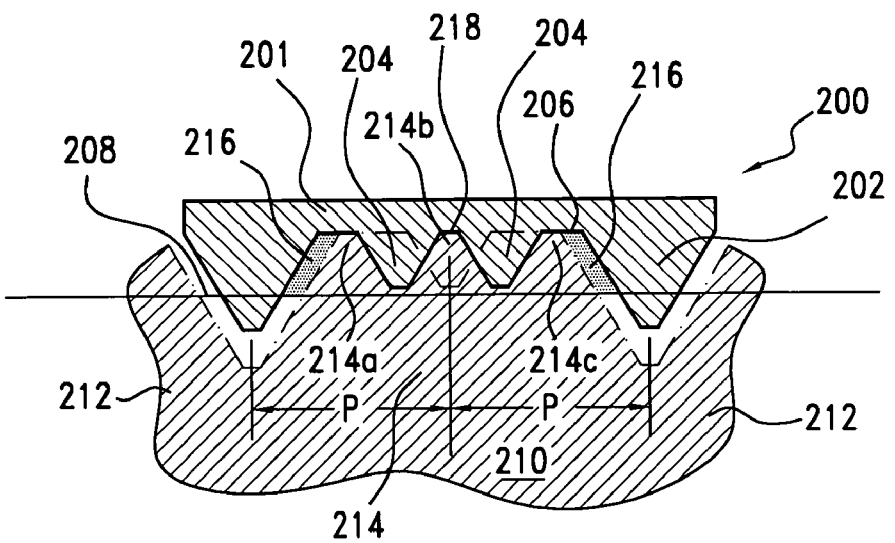
FIG. 19 is a schematic view, similar to that of FIG. 18, showing, however, one of a pair of new and improved thread rolling dies, constructed in accordance with the principles and teachings of the invention, as disclosed within United States Patent Application, entitled THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER, filed on Dec. 18, 2002, and which has been assigned Ser. No. 10/323,265, which is utilized for forming a "hi-low" thread form upon a blank member, wherein the "hi-low" thread comprises a first, primary thread lead and a pair of second, auxiliary thread leads, and wherein further, successive threads of the first, primary and second, auxiliary thread leads are formed at alternative axial positions along the blank member.

As therefore disclosed within FIG. 19, a threaded fastener, which has been developed in accordance with the principles and teachings of the invention as disclosed within the aforenoted United States Patent Application, entitled THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER, which was filed on Dec. 18, 2002, and which has been assigned Ser. No. 10/323,265, is generally indicated by the reference character 200. It is to be appreciated that in view of the fact that the threaded fastener 200, as well as the thread rolling dies 210 utilized in connection with the formation of the threaded fastener 200, are similar to the conventional threaded fastener 100 and the thread rolling dies 110 utilized in connection with the formation of the conventional threaded fastener 100, except as will be more specifically noted hereinafter, the threaded fastener 200, the thread rolling dies 210, and the various components of such structures will be denoted by reference characters which correspond to the reference characters used in connection with the description of the conventional threaded fastener 100 and the thread rolling dies 110 used in connection with the fabrication of the same, however, the reference characters used in connection with the description of the threaded fastener 200, as well as in connection with the de-scription of the thread rolling dies 210 used in connection with the fabrication of the threaded fastener 200, will be within the 200 series.

As was the case with the conventional threaded fastener 100, the threaded fastener 200 is of the type which is known in the industry as a "hi-low" thread form in view of the fact that the same substantially comprises a shank portion 201 upon which two different thread leads, that is, a first, primary thread lead 202, and a second, auxiliary thread lead 204 which provides reinforcement characteristics to the threaded fastener 200. It is noted, however, that in lieu of the provision of a single second, auxiliary thread lead upon the threaded fastener 200, as was the case with the conventional threaded fastener 100, there is provided a pair of axially spaced second, auxiliary thread leads 204. More particularly, it is seen that the primary and dual auxiliary thread leads 202, 204 are disposed upon the threaded fastener 200 in such a manner that successive portions or threads of the pair of auxiliary thread leads 204 are interposed between successive portions or threads of the primary thread lead 202 along the axial extent of the threaded fastener 200. In particular, it is especially noted that the axial distance or pitch, as defined between each set of primary and auxiliary thread leads 202, 204, is the same as the axial distance or pitch, as defined between each set of primary and auxiliary thread leads 102, 104 which was characteristic of the conventional threaded fastener 100, and is accordingly denoted by the reference character P. In addition, the axial distance or pitch, as defined between, for example, successive primary thread leads 202, 202, or between, for example, successive sets of the auxiliary thread leads 204, 204, is the same as the axial distance or pitch, as defined between, for example, successive primary thread leads 102, 102, or between, for example, successive auxiliary thread leads 104, 104 which was characteristic of the conventional threaded fastener 100 and is accordingly denoted by the reference character 2P. The root portion of the threaded fastener 200 is disclosed at 206, and it is noted that, as was the case with the conventional threaded fastener 100, the crest height of the first, primary thread lead 202, as measured from the root portion 206 of the threaded fastener 200, is adapted to be at least twice the crest height of the pair of second, auxiliary thread leads 204 as similarly measured from the root portion 206 of the threaded fastener 200.

One of a pair of thread rolling dies, for forming the primary and auxiliary leads 202, 204 upon a fastener blank member 208, in a manner similar to the aforenoted use of the thread rolling dies 10, 10a, 110 in connection with the formation of the threads upon the fastener blank members 9, 108, is disclosed at 210, and it is seen that in order to ultimately form the primary and auxiliary thread leads 202, 204 upon the fastener blank member 208, the thread rolling die 210 comprises a plurality of primary thread rolling die threads 212, and a plurality of auxiliary thread rolling die threads 214. In particular, in a manner corresponding to the alternative disposition of the first, primary thread leads 202 and the set of second, auxiliary thread leads 204 upon the threaded fastener 200, the plurality of primary thread rolling die threads 212 and the plurality of auxiliary thread rolling die threads 214 are alternatively disposed upon the thread rolling die 210. More particularly, in connection with each one of the auxiliary thread rolling die threads 214 for forming the set or pair of second, auxiliary thread leads 204 upon the blank member 208 in conjunction with the ultimate formation of the threaded fastener 200, it is seen that the crest portion of each auxiliary thread rolling die thread 214 actually comprises three crest portions 214a, 214b, 214c. As was the case with each one of the crest portions 114a, 114b of the conventional thread rolling die 110, each one of the crest portions 214a, 214b, 214c has a lateral or transverse extent of between 0.003–0.010 inches, and in addition, the crest portions 214a, 214b, 214c are laterally or transversely spaced from each other by means of a predetermined distance so as to in fact form each one of the pair of second, auxiliary thread leads 204, 204 therebetween during the thread rolling process.

The significance of providing each one of the auxiliary thread rolling die threads 214, so as to effectively comprise three, laterally or transversely spaced crest portions 214a, 214b, 214c for thereby forming the dual set or pair of second, auxiliary thread leads 204, 204 upon the blank member 208, which is ultimately used to form the new and improved threaded fastener 200, will now be addressed. In particular, it has been noted that the depth of penetration of the thread rolling dies increases as the thread rolling process continues in order to ultimately form, or complete the formation of the first, primary thread lead upon the blank member, once the formation of, for example, the second, auxiliary thread lead has been formed so as to have a predetermined depth or crest height dimension. It is additionally noted that, as was the case with each one of the thread rolling die threads 112, 114, each one of the thread rolling dies threads 212, 214 is disposed at a predetermined angle with respect to the longitudinal or axial extent or axis of the thread rolling die 210. Consequently, it can be appreciated further that in order to fully form the first, primary thread lead 202 upon the blank member 208 which will ultimately serve as the threaded fastener 200, a predetermined amount of blank member material 216 must be moved or displaced a predetermined lateral or transverse distance. It is to be additionally recalled that, as is conventionally known in accordance with thread rolling manufacturing techniques and the practical limitations inherently associated therewith, a predetermined amount of blank member material can only be displaced a predetermined distance during each rotation or revolution of the blank member along the pair of cooperating thread rolling dies in order to in fact achieve good, reliable, straight threads upon the blank member.

Still further, it has also been heretofore noted that the greater the distance that the blank member material must be moved or displaced during, for example, the complete formation of the primary thread lead upon the blank member, the greater the number of rotations or revolutions that the blank member must undergo during the thread rolling process until the primary thread lead is fully formed upon the original blank member. Consequently, if the blank member must undergo a substantially large number of rotations or revolutions during the thread rolling process, then the longitudinal or axial length of each thread rolling die must be substantially large which, in turn, requires the use of a substantially large thread rolling machine which renders the manufacture of the threaded fasteners relatively costly. It has also been noted that since the practical problem in connection with the formation of, for example, the first, primary thread lead 202 upon the fastener blank member 208 resides in the fact that the pitch spacing defined between successive threads of the first, primary thread lead 202 is 2P, and that the distance through which the material of the blank member must therefore be moved or displaced during the thread rolling process is a function of such pitch spacing 2P, then the solution to this problem would seem to be to effectively reduce or shorten the distance, defined between the successive threads of the first, primary thread lead 202, through which the material of the blank member 208 needs to be displaced or moved in conjunction with the complete formation of the first, primary thread lead 202 and the successive threads thereof during the thread rolling process. The shortening of the actual pitch spacing 2P between successive threads of the first, primary thread lead 202 has been noted, however, as not being a viable solution to the aforenoted problem in view of the fact that such would increase the number of threads per inch of the threaded fastener 200 which would, in turn, adversely alter the operational characteristics of the threaded fastener 200.

However, as a result of the provision of the dual set or pair of second, auxiliary thread leads 204, 204, which are axially spaced apart through means of a predetermined distance or space 218 of, for example, 0.003–0.010 inches, within the same space defined between successive threads of the first, primary thread lead 202, that is, within the same distance or lineal pitch dimension 2P, the effective distances 216, 216, through which the material of the blank member 208 must be correspondingly moved or displaced in connection with the formation of the successive threads of the first, primary thread lead 202, are able to be substantially or significantly reduced. Since such distances 216, 216, through which the material of the blank member 208 must be correspondingly moved or displaced in connection with the formation of the successive threads of the first, primary thread lead 202, are able to be substantially or significantly reduced, the number of rotations or revolutions that the blank member 208 must undergo during the entire thread rolling process in order to in fact achieve the complete formation of the first, primary thread lead 202, is able to be proportionally reduced. Accordingly, the longitudinal or axial length of each thread rolling die can be proportionally reduced or shortened whereby, in turn, the use of a substantially reduced or smaller thread rolling machine is able to be correspondingly employed which renders the manufacture of the threaded fasteners 200 more cost effective. In addition, the provision of the dual set or pair of second, auxiliary thread leads 204, 204 upon the threaded fastener 200 increases the axial reinforcement characteristics imparted to the threaded fastener 200 over the axial extent thereof.

While the aforenoted structure of the thread rolling dies has facilitated the fastener manufacturing process whereby relatively shortened thread rolling dies and thread rolling machines can be employed in a more cost-effective manner, it has been experienced that the insertion torque required to drive, and fully insert such dual reinforcing lead threaded fasteners into an underlying substrate, is relatively high. More particularly, it has been determined that, as a result of the provision or presence of the second, auxiliary, dual reinforcing leads upon the shank portion of the fastener, wherein successive threads of the second, auxiliary dual reinforcing leads are interposed between successive threads of the first, primary lead of the threaded fastener, forward ones of the threads of the second, auxiliary dual reinforcing leads interfere somewhat with the flow or discharge of chips or debris of the underlying workpiece or substrate which are generated during the self-tapping of the threaded fastener within the pre-drilled bore of the underlying workpiece or substrate as the threaded fastener is driven and inserted into the underlying workpiece or substrate.

Accordingly, the fasteners are often not able to be fully driven and inserted into the underlying substrate or workpiece to their desired depths of penetration. More particularly, if the insertion torque normally required to rotationally drive and axially insert the threaded fasteners into the underlying substrate or workpiece exceeds or becomes greater than the torsional strength characteristics of the material from which the threaded fasteners are fabricated, then during the fastener driving and insertion operation with respect to the underlying substrate or workpiece, the head end portion of the threaded fastener will suffer or experience fracture whereby such head end portion of the fastener will separate from that portion of the threaded shank of the fastener which has already been driven and inserted into the underlying substrate or workpiece. Consequently, the threaded fastener can no longer be rotated and obviously cannot be driven or inserted further into the underlying workpiece or substrate to the desired or required depth so as to in fact achieve the desired or required degree of penetration within the underlying workpiece or substrate.

Figure 20:
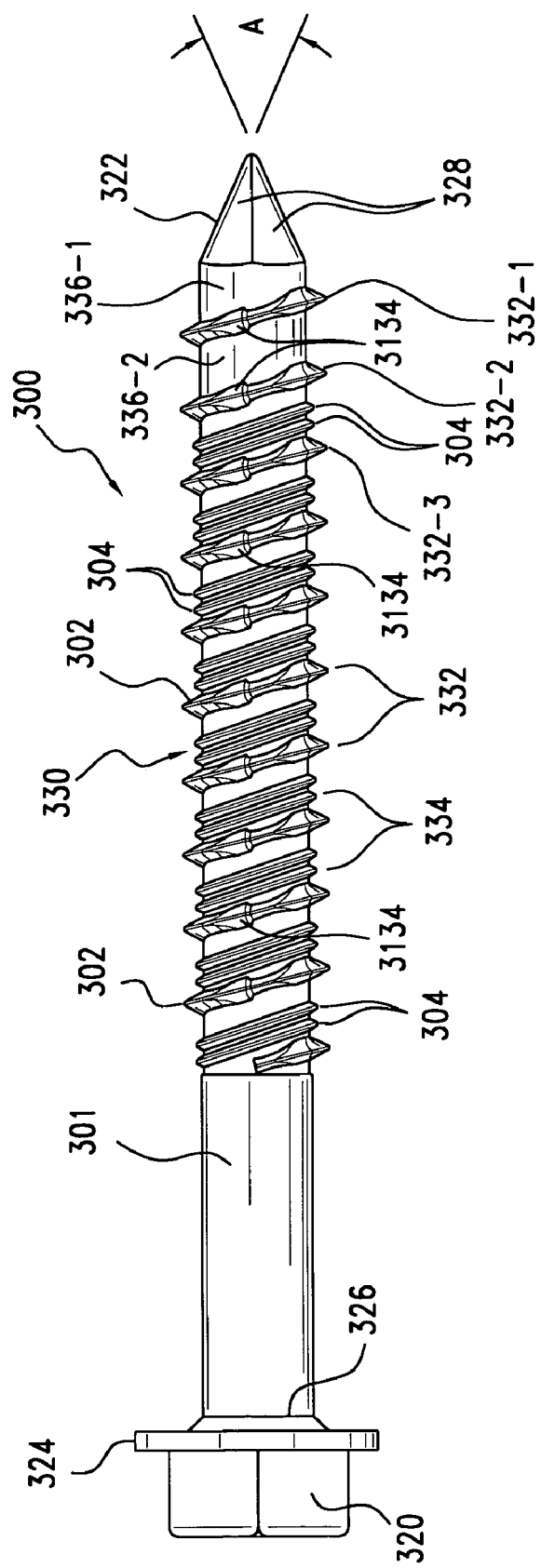
FIG. 20 is an axial cross-sectional view of a new and improved dual reinforcing lead threaded fastener, constructed in accordance with the principles and teachings of the present invention wherein the desired attributes, characteristic of the threaded fastener as disclosed within the aforenoted United States Patent Application which is entitled THREADED FASTENER WITH DUAL REINFORCING LEADS AND IMPROVED SUBSTRATE ENTRY END PORTION, which was filed on Apr. 15, 2003, supplemental to provisional patent application Ser. No. 60/438,228 which was filed on Jan. 6, 2003, and which has been assigned Ser. No. 10/413,751, are effectively preserved while effectively reducing the insertion torque characteristics of such threaded fastener whereby insertion of such threaded fastener into an underlying substrate or workpiece is facilitated so as to in fact enable full and complete depth penetration of the threaded fastener into the underlying substrate or workpiece to be achieved.

Accordingly then, with particular reference now being made to FIG. 20, a new and improved dual-reinforcing lead threaded fastener, constructed in accordance with the principles and teachings of the invention, as disclosed within U.S. patent application which is entitled THREADED FASTENER WITH DUAL REINFORCING LEADS AND IMPROVED SUBSTRATE ENTRY END PORTION, which was filed on Apr. 15, 2003, supplemental to provisional patent application Ser. No. 60/438,228 which was filed on Jan. 6, 2003, and which has been assigned Ser. No. 10/413,751, is disclosed and is generally indicated by the reference character 300. In view of the fact that the new and improved dual-reinforcing lead threaded fastener 300 is quite similar to the dual-reinforcing lead threaded fastener 200 as disclosed, for example, within FIG. 19, a detailed description of the new and improved dual-reinforcing lead threaded fastener 300 will not be included herewith for brevity purposes, however, the detailed description will in effect concentrate upon the structural differences comprising the dual-reinforcing lead threaded fastener 200 and the new and improved dual-reinforcing lead threaded fastener 300. It is also to be noted that in view of the structural similarities which exist between the dual-reinforcing lead threaded fastener 200 and the new and improved dual-reinforcing lead threaded fastener 300, structural components of the new and improved dual-reinforcing lead threaded fastener 300 which correspond to the structural components of the dual-reinforcing lead threaded fastener 200 will be designated by corresponding reference characters except that the reference characters will be within the 300 series. More particularly, then, it is seen that the new and improved dual-reinforcing lead threaded fastener 300 comprises a shank portion 301, a hexagonally shaped head portion 320 integrally formed upon a first end portion of the shank portion 301, and a pointed tip portion 322 integrally formed upon a second opposite end portion of the shank portion 301. The head portion 320 is integrally connected to the shank portion 301 by means of a flanged portion 324 and a tapered or chamfered neck portion 326, and the pointed tip portion 322 has the configuration of a pyramid comprising a plurality of facets 328 and an included angle A, as defined between diametrically opposite sides of the tip portion 322, which is within the range of 43–47°.

The shank portion 301 of the threaded fastener 300 is provided with a threaded section 330 which, in accordance with the teachings and principles as previously set forth and described in conjunction with the formation of the threaded fastener 200 as disclosed within FIG. 19, comprises a first, primary thread lead 302 and a pair of second, auxiliary thread leads 304, 304. The single primary and dual auxiliary thread leads 302, 304, 304 are substantially identical to the single primary and dual auxiliary thread leads 202, 204, 204 of the threaded fastener 200 as disclosed within FIG. 19 in that the first, primary thread lead 302 comprises a plurality of successive, axially spaced primary threads 332, while each one of the second, auxiliary thread leads 304, 304 comprises a plurality of successive, axially spaced auxiliary threads 334, 334, and accordingly, a detailed description of the same will be omitted herefrom in the interest of brevity. It is noted, however, as disclosed within FIG. 20, that the threaded section 330 of the threaded fastener 300 can have a predetermined axial extent, which may in fact be varied depending upon various factors or parameters, such as, for example, the particular workpiece or substrate into which the threaded fastener 300 is to be driven and inserted, the desired torque insertion and pull-out resistance values, and the like, however, as disclosed within FIG. 20, for example, the axial extent of the threaded section 330 of the threaded fastener 300 can in fact comprise approximately at least one-half to two-thirds of the axial length of the threaded fastener 300.

In order to clearly appreciate the unique and novel teachings and principles of the present invention, the forwardmost primary threads have been designated as 332-1, 332-2, and 332-3 with the first primary thread 332-1 being axially located immediately upstream of the pointed tip portion 322 of the threaded fastener 300, while the second and third primary threads 332-2, 332-3 being axially located upstream of the first primary thread 332-1 and respectively axially separated from each other through means of an axial distance or pitch of 2P in accordance with the teachings and principles as noted in connection with the structure set forth and described in connection with FIG. 19. Recalling that the insertion torque required to drive and fully insert a fastener, such as that illustrated within FIG. 19, into an underlying substrate or workpiece has been experienced as being relatively high in view of the fact that forward ones of the threads of the second, auxiliary dual reinforcing leads 204, 204 have apparently interfered somewhat with the flow or discharge of chips or debris of the underlying workpiece or substrate which is generated during the self-tapping of the threaded fastener 200 within the pre-drilled bore of the underlying workpiece or substrate as the threaded fastener 200 is driven and inserted into the underlying workpiece or substrate, it is seen that in accordance with the principles and teachings of the present invention, the forwardmost ones of the auxiliary threads 334 of the second, auxiliary thread leads 304, 304 have been removed from the forward end of the threaded section 330 of the threaded fastener 300.

More particularly, the axial section of the shank portion 301 of the threaded fastener 300, which is defined between the tip portion 322 of the threaded fastener 300 and the first primary thread 332-1, is totally devoid of any of the auxiliary threads 334 of the second, auxiliary thread leads 304, 304 so as to effectively define a first peripherally or circumferentially extending space, recess, or pocket 336-1 within which chips or debris of the underlying workpiece or substrate, into which the threaded fastener 300 is being driven and inserted, can be temporarily accommodated or accumulated as the pointed tip portion 322 of the threaded fastener 300, as well as the first primary thread 332-1 of the threaded fastener 300, begin to enter the workpiece or substrate and thereby start generating or forming such chips or debris. In a similar manner, the axial section of the shank portion 301 of the threaded fastener 300, which is defined between the first primary thread 332-1 and the second primary thread 332-2, is likewise totally devoid of any of the auxiliary threads 334 of the second, auxiliary thread leads 304, 304 so as to effectively define a second peripherally or circumferentially extending space, recess, or pocket 336-2 within which chips or debris of the underlying workpiece or substrate, into which the threaded fastener 300 is being driven and inserted, can likewise be temporarily accommodated or accumulated.

It can be readily appreciated that such debris or chips will subsequently fall into the bottom depths of the bore pre-drilled within the underlying workpiece or substrate and that the provision of the recesses or pockets 336-1, 336-2 effectively provide for the accommodation of such debris or chips until such debris or chips do in fact fall down into the bottom region of the pre-drilled bore. As a result of such an accommodation of the debris or chips within the recesses or pockets 336-1, 336-2, such debris or chips do not interfere with or adversely hinder the self-tapping advancement of the forwardmost ones of the primary threads 332-1, 332-2 whereby insertion torque levels can be dramatically reduced. While it has been noted that the pockets or recesses 336-1, 336-2 may be operatively provided in conjunction with the first and second primary threads 332-1 and 332-2, a similar pocket or recess may optionally be provided in conjunction with additional primary threads, such as, for example, between the second primary thread 332-2 and the third primary thread 332-3 as torque insertion levels may dictate or require. It is lastly noted that each one of the threads of the first, primary thread lead 302 can be provided with boss or lobe members, and adjacent base portions, similar to the boss or lobe members 134 and base portions 136 as shown in connection with the thread form disclosed within FIG. 13, and accordingly, such boss or lobe members of such a thread form are illustrated within the threaded fastener 300 of FIG. 20 at 3134.

Thus, it may be seen that in accordance with the principles and teachings of the present invention, there has been developed a new and improved threaded fastener wherein not only has the thread rolling process or technique for manufacturing the threaded fastener been substantially facilitated, but in addition, torque insertion levels have been dramatically reduced due to the elimination of any interference between debris or chips and the threaded fastener during the fastener driving and insertion procedure. In addition, the structural profiles of the thread leads contain boss or lobe members, and base portions, which may be varied or tailored in connection with their height and width dimensions, as well as their incline surface angles, so as to achieve optimal torque insertion and pull-out resistance properties or characteristics for the fasteners. In addition, as a result of the aforenoted reduction in the torque insertion levels, the threaded fasteners will not experience premature rupture or failure whereby the threaded fasteners will be capable of being driven and inserted into the underlying substrate or workpiece to the desired penetration depth levels.

Obviously, many variations and modifications of the present invention are possible in light of the above teachings. For example, while particular dimensions of the threaded fastener, the axial distances defined between successive threads, or the relative sizes of the thread leads, have been noted, such dimensions, distances, or sizes can of course be altered as may be desired in order to correspondingly alter the performance characteristics of the threaded fastener without departing from the principles and teachings of the present invention. It is therefore to be understood that within the scope of the appended claims, the present invention may be practiced otherwise than as specifically described herein.

What is claimed as new and desired to be protected by Letter Patent of the United States of America, is:

1. A threaded fastener adapted to be threadedly inserted into a workpiece, comprising:
   a shank portion having an axial extent;
   a tip portion formed upon one end of said shank portion;
   a first, primary thread lead disposed upon said shank portion and comprising a plurality of first, primary threads which are successively disposed upon said shank portion at positions which are spaced from each other by means of first predetermined axially spaced distances;
   a plurality of lobe members disposed along the length of said first, primary thread lead and upon said plurality of first, primary threads wherein at least a first one of said plurality of lobes has a variable height dimension, as considered in the direction extending from a root portion of said first, primary thread lead to a crest portion of said first, primary thread lead, and a variable width dimension as considered in the direction extending along said length of said first, primary thread lead;
   a dual set of second, auxiliary thread leads disposed upon said shank portion, wherein each one of said dual set of second, auxiliary thread leads comprises a plurality of second, auxiliary threads which are successively disposed upon said shank portion at positions which are spaced from each other by means of second predetermined axially spaced distances and which are interposed between said plurality of successively disposed first, primary threads; and
   first and second spaces, respectively defined between said tip portion of said threaded fastener and a first forwardmost one of said first, primary threads, and between said first forwardmost one of said first, primary threads and a second one of said first, primary threads, devoid of said second, auxiliary threads so as to be capable of accommodating debris from the workpiece, as said threaded fastener is threadedly inserted into the workpiece, such that the debris from the workpiece does not interfere with the insertion of said threaded fastener into the workpiece whereby insertion torque levels, characteristic of the threaded insertion of said threaded fastener into the workpiece, are relatively low and increase at a substantially low, constant rate.

2. The threaded fastener as set forth in claim 1, wherein:
   said first and second spaces extend circumferentially around said shank portion of said threaded fastener.

3. The threaded fastener as set forth in claim 1, wherein:
   said plurality of successively disposed second, auxiliary threads, comprising said dual set of second, auxiliary thread leads, are axially spaced from each other by means of third predetermined axially spaced distances.

4. The threaded fastener as set forth in claim 3, wherein:
   said first predetermined axially spaced distances, defined between said plurality of successively disposed first, primary threads of said first, primary thread lead, are substantially equal to said third predetermined axially spaced distances, defined between said plurality of successively disposed second, auxiliary threads of said dual set of second, auxiliary thread leads.

5. The threaded fastener as set forth in claim 1, wherein:
   said plurality of successively disposed second, auxiliary threads, comprising said dual set of second, auxiliary thread leads, are axially spaced from said plurality of successively disposed first, primary threads, comprising said first, primary thread lead, by means of predetermined fourth distances; and
   wherein further, said first predetermined axially spaced distances, defined between said plurality of successively disposed first, primary threads of said first, primary thread lead, are equal to twice said predetermined fourth axially spaced distances defined between said plurality of successively disposed second, auxiliary threads comprising said dual set of second, auxiliary thread leads.

6. The threaded fastener as set forth in claim 1, wherein:
   said second predetermined distances, defined between said plurality of second, auxiliary threads comprising said dual set of second, auxiliary thread leads, are within the range of 0.003–0.010 inches.

7. The threaded fastener as set forth in claim 1, wherein:
   the crest height of said plurality of first, primary threads, as measured from said root portion of said first, primary thread lead disposed upon said shank portion of said threaded fastener, is at least twice the crest height of said plurality of second, auxiliary threads, as measured from a root portion of one of said plurality of second, auxiliary thread leads disposed upon said shank portion of said threaded fastener.

8. The threaded fastener as set forth in claim 1, wherein:
said tip portion comprises a pointed tip portion having a geometrical configuration which is substantially that of a pyramid.

9. The threaded fastener as set forth in claim 8, wherein:
diametrically opposite facet sides of said pyramid are disposed with respect to each other so as to have an included angle defined therebetween which is within the range of 43–47°.

10. The threaded fastener as set forth in claim 1, wherein:
said first, primary and second, auxiliary thread leads extend along said shank portion of said threaded fastener which comprises one-half to two-thirds of said axial extent of said shank portion of said threaded fastener.

11. The threaded fastener as set forth in claim 1, further comprising:
a plurality of base sections alternatively interposed between successive ones of said plurality of lobe members.

12. The threaded fastener as set forth in claim 11, wherein:
each one of said plurality of base sections and a corresponding one of said plurality of lobe members collectively have an arrowhead configuration.

13. The threaded fastener as set forth in claim 1, wherein:
opposite ends of each one of said plurality of lobe members define predeterminedly configured lead-in and lead-out portions for affecting insertion torque and pull-out resistance characteristics of said threaded fastener depending upon the orientation of said lobe members upon said first, primary thread lead.

14. The threaded fastener as set forth in claim 1, wherein:
some of said variable height and width dimensions of said plurality of lobe members vary non-linearly.

15. A threaded fastener adapted to be threadedly inserted into a substrate, comprising:
a shank portion having an axial extent;
a tip portion formed upon one end of said shank portion;
a first, primary thread lead disposed upon said shank portion and comprising a plurality of first, primary threads which are successively disposed upon said shank portion at positions which are spaced from each other by means of first predetermined axially spaced distances;
a plurality of lobe members disposed along the length of said first, primary thread lead and upon said plurality of first, primary threads wherein at least a first one of said plurality of lobes has a variable height dimension, as considered in the direction extending from a root portion of said first, primary thread lead to a crest portion of said first, primary thread lead, and a variable width dimension as considered in the direction extending along said length of said first, primary thread lead;
a dual set of second, auxiliary thread leads disposed upon said shank portion, wherein each one of said dual set of second, auxiliary thread leads comprises a plurality of second, auxiliary threads which are successively disposed upon said shank portion at positions which are spaced from each other by means of second predetermined axially spaced distances and which are interposed between said plurality of successively disposed first, primary threads; and first and second spaces, respectively defined between said tip portion of said threaded fastener and a first forwardmost one of said first, primary threads, and between said first forwardmost one of said first, primary threads and a second one of said first, primary threads, devoid of said second, auxiliary threads so as to be capable of accommodating debris from the substrate, as said threaded fastener is threadedly inserted into the substrate, such that the debris from the substrate does not interfere with the insertion of said threaded fastener into the substrate whereby insertion torque levels, characteristic of the threaded insertion of said threaded fastener into the substrate, are relatively low and increase at a substantially low, constant rate, so as to, in turn, permit said threaded fastener to achieve substantially enhanced depth penetration within the substrate.

16. The threaded fastener as set forth in claim 15, wherein:
said first and second spaces extend circumferentially around said shank portion of said threaded fastener.

17. The threaded fastener as set forth in claim 15, wherein:
said plurality of successively disposed second, auxiliary threads, comprising said dual set of second, auxiliary thread leads, are axially spaced from each other by means of third predetermined axially spaced distances.

18. The threaded fastener as set forth in claim 16, wherein:
said first predetermined axially spaced distances, defined between said plurality of successively disposed first, primary threads of said first, primary thread lead, are substantially equal to said third predetermined axially spaced distances, defined between said plurality of successively disposed second, auxiliary threads of said dual set of second, auxiliary thread leads.

19. The threaded fastener as set forth in claim 15, wherein:
said plurality of successively disposed second, auxiliary threads, comprising said dual set of second, auxiliary thread leads, are axially spaced from said plurality of successively disposed first, primary threads, comprising said first, primary thread lead, by means of predetermined fourth distances; and
wherein further, said first predetermined axially spaced distances, defined between said plurality of successively disposed first, primary threads of said first, primary thread lead, are equal to twice said predetermined fourth axially spaced distances defined between said plurality of successively disposed second, auxiliary threads comprising said dual set of second, auxiliary thread leads.

20. The threaded fastener as set forth in claim 15, wherein:
said second predetermined distances, defined between said plurality of second, auxiliary threads comprising said dual set of second, auxiliary thread leads, are within the range of 0.003–0.010 inches.

21. The threaded fastener as set forth in claim 15, wherein:
the crest height of said plurality of first, primary threads, as measured from said root portion of said first, primary thread lead disposed upon said shank portion of said threaded fastener, is at least twice the crest height of said plurality of second, auxiliary threads, as measured from a root portion of one of said plurality of second, auxiliary thread leads disposed upon said shank portion of said threaded fastener.

22. The threaded fastener as set forth in claim 15, wherein:
said tip portion comprises a pointed tip portion having a geometrical configuration which is substantially that of a pyramid.

23. The threaded fastener as set forth in claim 22, wherein:
diametrically opposite facet sides of said pyramid are disposed with respect to each other so as to have an included angle defined therebetween which is within the range of 43–47°.

24. The threaded fastener as set forth in claim 15, wherein:
said first, primary and second, auxiliary thread leads extend along said shank portion of said threaded fastener which comprises one-half to two-thirds of said axial extent of said shank portion of said threaded fastener.

25. The threaded fastener as set forth in claim 15, further comprising:
a plurality of base sections alternatively interposed between successive ones of said plurality of lobe members.

26. The threaded fastener as set forth in claim 25, wherein:
each one of said plurality of base sections and a corresponding one of said plurality of lobe members collectively have an arrowhead configuration.

27. The threaded fastener as set forth in claim 15, wherein:
opposite ends of each one of said plurality of lobe members define predeterminedly configured leadin and lead-out portions for affecting insertion torque and pull-out resistance characteristics of said threaded fastener depending upon the orientation of said lobe members upon said first, primary thread lead.

28. The threaded fastener as set forth in claim 15, wherein:
some of said variable height and width dimensions of said plurality of lobe members vary non-linearly.

29. A thread rolling die for forming a threaded fastener, comprising:
a body portion having a longitudinal axis;
a working face disposed upon said body portion;
a plurality of first, primary thread rolling die threads, disposed upon said working face of said body portion and oriented at a predetermined angle with respect to said longitudinal axis of said body portion, for forming a first, primary thread lead, comprising a plurality of first, primary threads, upon a blank member, wherein said plurality of first, primary thread rolling die threads are spaced from each other by means of first predetermined transversely spaced distances such that the first, primary threads are successively formed upon the blank member at first predetermined positions which are spaced from each other by means of first predetermined axially spaced distances;
a plurality of recesses formed upon said plurality of first, primary thread rolling die threads for forming a plurality of lobe members upon said first, primary thread lead wherein at least one of said plurality of lobes will have a variable height dimension, as considered in the direction extending from a root portion of said first, primary thread lead to a crest portion of said first, primary thread lead, and a variable width dimension as considered in the direction extending along said length of said first, primary thread lead; and
a plurality of sets of second, auxiliary thread rolling die threads, disposed upon said working face of said body portion at positions transversely interposed between said plurality of first, primary thread rolling die threads and oriented at a predetermined angle with respect to said longitudinal axis of said body portion, for forming a dual set of second, auxiliary thread leads, each comprising a plurality of second, auxiliary threads, upon the blank member, wherein said plurality of second, auxiliary thread rolling die threads, comprising each one of said plurality of sets of second, auxiliary thread rolling die threads, are spaced from each other by means of second predetermined transversely spaced distances such that, as a result of said disposition of said plurality of sets of second, auxiliary thread rolling die threads, for forming said dual set of second, auxiliary threads, between said plurality of first, primary thread rolling die threads, when the plurality of first, primary threads are successively formed upon the blank member at the first predetermined positions, the distances through which material portions of the blank member, utilized for forming the plurality of first, primary threads upon the blank member, need to be moved is effectively minimized thereby, in turn, minimizing the length dimension of said thread rolling die required to completely form the threaded fastener from the blank member.

30. A method of forming a threaded fastener, comprising the steps of:
providing a pair of thread rolling dies wherein each one of said pair of thread rolling dies comprises a body portion having a longitudinal axis; a working face disposed upon said body portion; a plurality of first, primary thread rolling die threads, disposed upon said working face of said body portion and oriented at a predetermined angle with respect to said longitudinal axis of said body portion, for forming a first, primary thread lead, comprising a plurality of first, primary threads, upon a blank member during a thread rolling process, wherein said plurality of first, primary thread rolling die threads are spaced from each other by means of first predetermined transversely spaced distances such that said first, primary threads will be successively formed upon said blank member at first predetermined positions which are spaced from each other by means of first predetermined axially spaced distances; a plurality of recesses formed upon said plurality of first, primary thread rolling die threads for forming a plurality of lobe members upon said first, primary thread lead wherein at least one of said plurality of lobes will have a variable height dimension, as considered in the direction extending from a root portion of said first, primary thread lead to a crest portion of said first, primary thread lead, and a variable width dimension as considered in the direction extending along said length of said first, primary thread lead; and a plurality of sets of second, auxiliary thread rolling die threads, disposed upon said working face of said body portion at positions transversely interposed between said plurality of first, primary thread rolling die threads and oriented at a predetermined angle with respect to said longitudinal axis of said body portion, for forming a dual set of second, auxiliary thread leads, each comprising a plurality of second, auxiliary threads, upon said blank member during said thread rolling process, wherein said plurality of second, auxiliary thread rolling die threads, comprising each one of said plurality of sets of second, auxiliary thread rolling die threads, are spaced from each other by means of second predetermined transversely spaced distances;

positioning said pair of thread rolling dies with respect to each other such that said working faces of said pair of thread rolling dies are oppositely disposed toward each other in a spaced apart mode;

interposing said blank member between said oppositely disposed spaced apart working faces of said pair of thread rolling dies; and rolling said blank member between said pair of spaced apart thread rolling dies such that, as a result of said disposition of said plurality of sets of second, auxiliary thread rolling die threads, for forming said dual set of second, auxiliary threads, between said plurality of first, primary thread rolling die threads, when said plurality of first, primary threads are successively being formed upon said blank member at the first predetermined positions, the distances, through which material portions of said blank member utilized for forming said plurality of first, primary threads upon said blank member need to be moved, is effectively minimized thereby, in turn, minimizing the length dimensions of said pair of thread rolling dies required to completely form said threaded fastener from said blank member.

31. A threaded fastener adapted to be threadedly inserted into a workpiece, comprising:

a shank portion having an axial extent;

a first, primary thread lead disposed upon said shank portion and comprising a plurality of first, primary threads which are successively disposed upon said shank portion at positions which are spaced from each other by means of first predetermined axially spaced distances;

a plurality of lobe members disposed along the to be moved is effectively minimized thereby, in turn, minimizing the number of revolutions that the blank member must undergo during the entire thread forming process whereby, in turn, the length dimension of said thread rolling die, required to completely form the threaded fastener from the blank member, may be correspondingly minimized.

32. The threaded fastener as set forth in claim 31, wherein:

said plurality of successively disposed second, auxiliary threads, comprising said dual set of second, auxiliary thread leads, are axially spaced from each other by means of third predetermined axially spaced distances.

33. The threaded fastener as set forth in claim 32, wherein:

said first predetermined axially spaced distances, defined between said plurality of successively disposed first, primary threads of said first, primary thread lead, length of said first, primary thread lead and upon said plurality of first, primary threads wherein at least a first one of said plurality of lobes has a variable height dimension, as considered in the direction extending from a root portion of said first, primary thread lead to a crest portion of said first, primary thread lead, and a variable width dimension as considered in the direction extending along said length of said first, primary thread lead; and a dual set of second, auxiliary thread leads disposed upon said shank portion, wherein each one of said dual set of second, auxiliary thread leads comprises a plurality of second, auxiliary threads which are successively disposed upon said shank portion at positions which are spaced from each other by means of second predetermined axially spaced distances and which are interposed between said plurality of successively disposed first, primary threads such that, as a result of said disposition of said plurality of sets of second, auxiliary threads between said plurality of first, primary threads, when said plurality of first, primary threads are successively formed upon a blank member at said first predetermined positions, the distances through which material portions of the blank member, utilized for forming the plurality of first, primary threads upon the blank member, need are substantially equal to said third predetermined axially spaced distances, defined between said plurality of successively disposed second, auxiliary threads of said dual set of second, auxiliary thread leads.

34. The threaded fastener as set forth in claim 31, wherein:

said plurality of successively disposed second, auxiliary threads, comprising said dual set of second, auxiliary thread leads, are axially spaced from said plurality of successively disposed first, primary threads, comprising said first, primary thread lead, by means of predetermined fourth distances; and wherein further, said first predetermined axially spaced distances, defined between said plurality of successively disposed first, primary threads of said first, primary thread lead, are equal to twice said predetermined fourth axially spaced distances defined between said plurality of successively disposed second, auxiliary threads comprising said dual set of second, auxiliary thread leads.

35. The threaded fastener as set forth in claim 31, wherein:

said second predetermined distances, defined between said plurality of second, auxiliary threads comprising said dual set of second, auxiliary thread leads, are within the range of 0.003–0.010 inches.

36. The threaded fastener as set forth in claim 31, wherein:

the crest height of said plurality of first, primary threads, as measured from said root portion of said first, primary thread lead disposed upon said shank portion of said threaded fastener, is at least twice the crest height of said plurality of second, auxiliary threads, as measured from a root portion of one of said plurality of second, auxiliary thread leads disposed upon said shank portion of said threaded fastener.

37. The threaded fastener as set forth in claim 31, further comprising:

a plurality of base sections alternatively interposed between successive ones of said plurality of lobe members.

38. The threaded fastener as set forth in claim 37, wherein:

each one of said plurality of base sections and a corresponding one of said plurality of lobe members collectively have an arrowhead configuration.

39. The threaded fastener as set forth in claim 31, wherein:

opposite ends of each one of said plurality of lobe members define predeterminedly configured lead-in and lead-out portions for affecting insertion torque and pull-out resistance characteristics of said threaded fastener depending upon the orientation of said lobe members upon said first, primary thread lead.

40. The threaded fastener as set forth in claim 31, wherein:

some of said variable height and width dimensions of said plurality of lobe members vary non-linearly.

* * * * *